(12) United States Patent
Nakayama

(10) Patent No.: US 7,701,603 B2
(45) Date of Patent: Apr. 20, 2010

(54) PRINT PROCESSING APPARATUS, PRINT PROCESSING METHOD, AND COMPUTER-READABLE MEDIUM STORING PRINT PROCESSING PROGRAM

(75) Inventor: Hidetoshi Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1053 days.

(21) Appl. No.: 11/207,800

(22) Filed: Aug. 22, 2005

(65) Prior Publication Data

US 2006/0044572 A1    Mar. 2, 2006

(30) Foreign Application Priority Data

Aug. 31, 2004   (JP)   ............... 2004-253480

(51) Int. Cl.
*G06F 3/12*   (2006.01)
*H04N 1/60*   (2006.01)

(52) U.S. Cl. ............... 358/1.15; 358/1.9; 358/1.13

(58) Field of Classification Search ............ 358/1.1, 358/1.9, 1.11–1.18; 400/61, 70, 76, 71
See application file for complete search history.

(56) References Cited

U.S. PATENT DOCUMENTS

| 5,995,723 | A | * | 11/1999 | Sperry et al. | ............... 358/1.15 |
| 6,149,323 | A | * | 11/2000 | Shima | ................... 400/76 |
| 6,519,048 | B1 | * | 2/2003 | Tanaka | ................. 358/1.13 |
| 7,281,064 | B2 | | 10/2007 | Wanda | |
| 7,471,407 | B2 | * | 12/2008 | Ferlitsch | ................. 358/1.15 |
| 2004/0070779 | A1 | * | 4/2004 | Ferlitsch | ................. 358/1.13 |

FOREIGN PATENT DOCUMENTS

| JP | 2000-003258 | 1/2000 |
| JP | 2003-157163 | 5/2003 |
| JP | 2004-178082 | 6/2004 |
| JP | 2004-216582 | 8/2004 |

\* cited by examiner

*Primary Examiner*—Thierry L Pham
(74) *Attorney, Agent, or Firm*—Dickstein Shapiro LLP

(57) ABSTRACT

A print processing apparatus is disclosed that performs print data processing based on a print command from an application. The apparatus includes a print data generating part that generates print data in a first format recognizable by a printing apparatus that executes a printing process, the print data being generated based on a print setting value for the print data and a notification setting value pertaining to notification of a processing state of the print data. The apparatus also includes a monitoring part that transmits the print data to the printing apparatus, monitors the processing state of the print data, and determines whether to conduct the notification pertaining to the processing state of the print data according to the notification setting value.

8 Claims, 23 Drawing Sheets

PRINT PROCESSING APPARATUS, PRINT PROCESSING METHOD, AND COMPUTER-READABLE MEDIUM STORING PRINT PROCESSING PROGRAM

BACKGROUND OF THE INVENTION

1. Field of the Invention

The present invention relates to a print processing apparatus, a print processing method, and a computer-readable medium storing a print processing program.

2. Description of the Related Art

In printing data generated by an application operating on an OS (operating system) such as Windows (registered trademark), the application is usually configured to output depiction data referred to as GDI (Graphic Device Interface) function to a graphic engine that is generally referred to as GDI. The GDI function is converted into the so-called DDI (Device Driver Interface) function and output to each printer driver that is prepared for each printer. The printer driver converts the DDI function from the graphic engine into data in a format that may be recognized by the printer such as PDL (Page Description Language). The converted data are stored in a spooler provided by the OS, and the spooler transmits the data to the printer to execute a print job (e.g., see Japanese Laid-Open Patent Publication No. 2000-3258 and Japanese Laid-Open Patent Publication No. 2004-46817).

FIG. 1 is a diagram showing an exemplary configuration of a print processing system according to the prior art. In the illustrated print processing system, print processing apparatuses 2101, 2102, and a printer 2103 are interconnected via a network 2100. For example, as is illustrated in FIG. 2, in this system, an application 2201 implemented in the print processing apparatus 2101 issues a print command to a printer driver 2202. The printer driver 2202 generates print data (PDL), and a spooler 2203 spools the data generated by the printer driver 2202. The spooler 2203 retrieves each set of print data from a print data queue and transmits the print data to a port monitor 2204. The port monitor 2204 transmits the print data to the printer 2103 via a communication module 2205.

FIG. 3 is a diagram showing a functional configuration of a print processing apparatus according to another prior art example. According to this illustrated example, a resident printer monitoring module 2300 is provided in the print processing apparatus 2101 to monitor the status of a print job. It is noted that other features of the print processing apparatus of this prior art example are identical to those described in relation to the example of FIG. 2.

In the print processing system according to the prior art, an external module such as the port monitor 2204 in the example of FIG. 2 or the resident printer monitor module 2300 in the example of FIG. 3 is configured to monitor the status of a print job within the printer 2103 during and after print data are transmitted to this printer 2103 and display a notification screen such as a popup display screen signaling the occurrence of an error or completion of the print job.

In such an error/completion notification system, the error/completion notification on/off setting may be stored in the port monitor 2204 or the resident printer monitor module 2300 as setting values of print utility software, for example. The setting of the error/completion notification may be realized by activating a print notification setting screen that is supported by the software, for example. Once the setting is set, the same setting is applied to every print job until the setting is changed using the print setting screen.

However, there may be cases in which error/completion notification is desired only for a particular print job (e.g., an important print job, or a large-scale print job requiring a long period of time) while the error/completion notification setting is set off (turned off) for a normal print job. In order to realize such a setting in the prior art, the print notification setting screen of the print utility software has to be activated before executing the particular print job to set the error/completion notification setting to on mode, and after status notification for this print job is completed, the error/completion notification setting has to be set back to off mode. Such operational procedures may be quite burdensome to the user.

It is also noted that in the prior art, the error/completion notification is transmitted only to certain print processing apparatuses such as the print processing apparatus generating the print data and a print processing apparatus designated by a user. In such a case, the progress of a print job may not be determined at a terminal apparatus that does not have the error/completion notification function set beforehand.

SUMMARY OF THE INVENTION

The present invention has been conceived in response to one or more of the problems of the related art, and its object is to provide a print processing technique that enables on/off setting of the error/completion notification function and setting of the notification destination for each print job to thereby improve usability.

According to one aspect of the present invention, a print processing apparatus is provided that performs print data processing based on a print command from an application, the apparatus including:

a print data generating part that generates print data in a first format recognizable by a printing apparatus that executes a printing process, the print data being generated based on a print setting value for the print data and a notification setting value pertaining to notification of a processing state of the print data; and a monitoring part that transmits the print data to the printing apparatus, monitors the processing state of the print data, and determines whether to conduct the notification pertaining to the processing state of the print data according to the notification setting value.

According to the above aspect of the present invention, a user may be able to select whether to conduct error/completion notification for every print job, or to conduct error/completion notification for a particular print job.

In a preferred embodiment of the present invention, the print data generating part converts the print data into a second format recognizable by the printing apparatus that executes the printing process based on notification destination information designating a destination for the notification.

According to the above embodiment, a user may select whether to conduct error/completion notification for every print job or to conduct error/completion notification for a particular print job, and set a notification destination for the error/completion notification.

According to another aspect of the present invention, a print processing apparatus is provided that performs print data processing based on a print command from an application; the apparatus including:

a print data generating part that generates print data in a format recognizable by a printing apparatus that executes a printing process, the print data being generated based on a print setting value for the print data;

a notification setting value output part that outputs a notification setting value pertaining to notification of a processing state of the print data to a file having a predetermined format; and a monitoring part that transmits the print data to the printing apparatus, and determines whether to conduct the notification of the processing state of the print data by referring to the file in which the notification setting value is described.

According to the above aspect of the present invention, a user may be able to select whether to conduct error/completion notification for every print job, or to conduct error/completion notification for a particular print job.

In a preferred embodiment of the present invention, the notification setting value output part outputs notification destination information designating a destination for the notification to the file having the predetermined format.

According to the above embodiment, a user may select whether to conduct error/completion notification for every print job or to conduct error/completion notification for a particular print job, and set a notification destination for the error/completion notification.

According to another aspect of the present invention, a print processing method is provided that includes:

a print data generating step for generating print data in a first format recognizable by a printing apparatus that executes a printing process, the print data being generated based on a print setting value for the print data and a notification setting value pertaining to notification of a processing state of the print data; and a monitoring step for transmitting the print data to the printing apparatus, monitoring the processing state of the print data, and determining whether to conduct the notification of the processing state of the print data according to the notification setting value.

According to the above aspect of the present invention, a user may be able to select whether to conduct error/completion notification for every print job, or to conduct error/completion notification for a particular print job.

In a preferred embodiment of the present invention, the print data generating step further includes a data format converting step for converting the print data into a second format recognizable by the printing apparatus that executes the printing process based on notification destination information designating a destination of the notification.

According to the above embodiment of the present invention, a user may be able to select whether to conduct error/completion notification for every print job, or to conduct error/completion notification for a particular print job, and set a notification destination for the error/completion notification.

According to another aspect of the present invention, a print processing method is provided that includes:

a print data generating step for generating print data in a format recognizable by a printing apparatus that executes a printing process, the print data being generated based on a print setting value for the print data;

a notification setting value outputting step for outputting a notification setting value pertaining to notification of a processing state of the print data to a file having a predetermined format; and a monitoring step for transmitting the print data to the printing apparatus, and determining whether to conduct the notification of the processing state of the print data by referring to the file in which the notification setting value is described.

According to the above aspect of the present invention, a user may be able to select whether to conduct error/completion notification for every print job, or to conduct error/completion notification for a particular print job.

In a preferred embodiment of the present invention, the notification setting value outputting step further includes a file outputting step for outputting notification destination information designating a destination of the notification to the file having the predetermined format.

According to the above embodiment of the present invention, a user may be able to select whether to conduct error/completion notification for every print job, or to conduct error/completion notification for a particular print job, and set a notification destination for the error/completion notification.

According to another aspect of the present invention, a computer-readable medium storing a print processing program run on a computer is provided, the program being executed by the computer to perform the steps of the print processing method according to the present invention.

DESCRIPTION OF THE PREFERRED EMBODIMENTS

In the following, preferred embodiments of the present invention are described with reference to the accompanying drawings.

Hardware Configuration of Print Processing Apparatus

In the following, a hardware configuration of a print processing apparatus according to an embodiment of the present invention is described.

Figure 4:
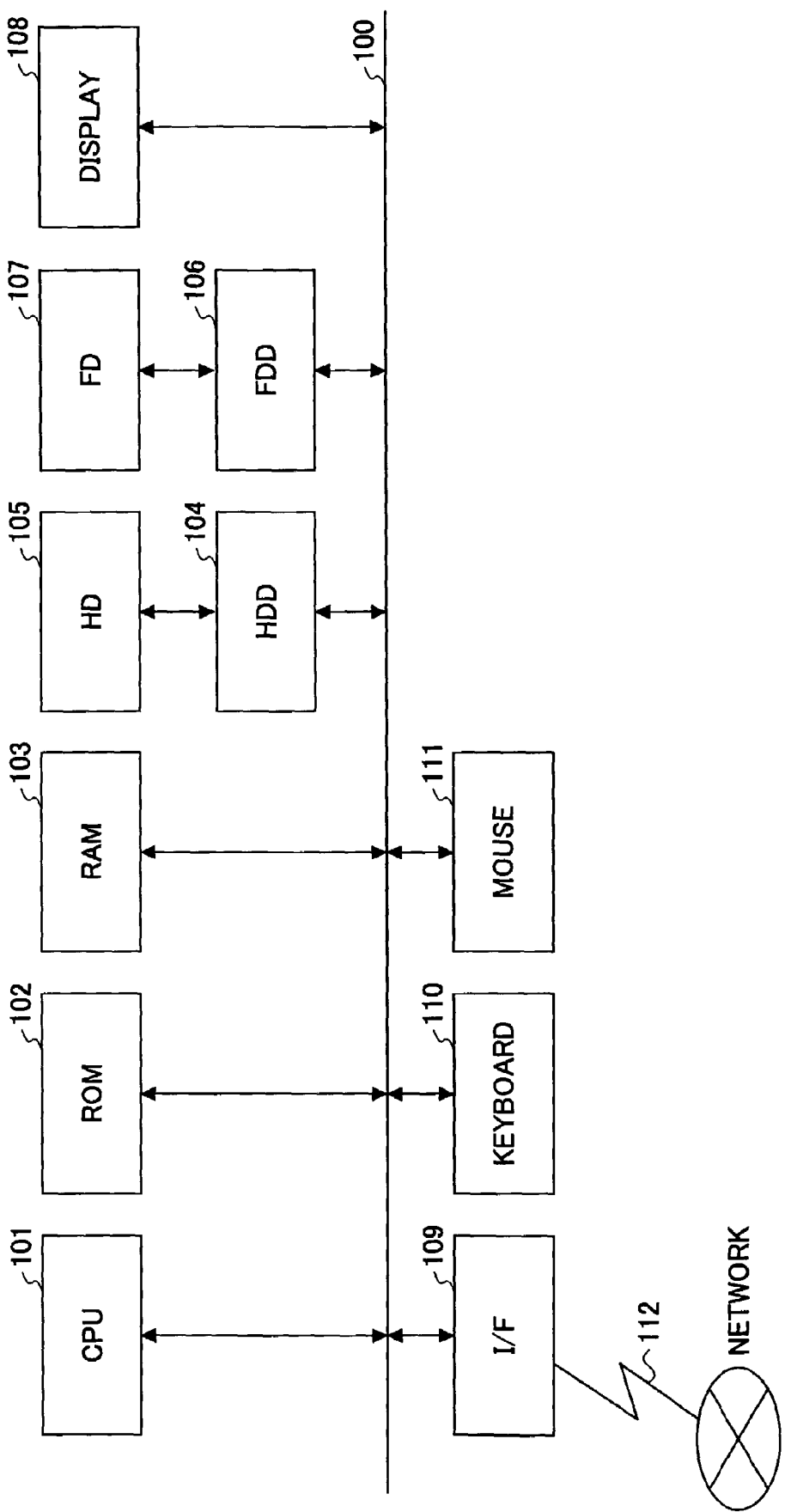
FIG. 4 is a block diagram illustrating a hardware configuration of a print processing apparatus according to an embodiment of the present invention.

FIG. 4 is a block diagram illustrating the hardware configuration of the print processing apparatus according to the present embodiment. The illustrated print processing apparatus includes a CPU 101, a ROM 102, a RAM 103, a HDD (hard disk drive) 104, a HD (hard disk) 105, a FDD (flexible disk drive) 106, a FD (flexible disk) 107 as an example of a detachable storage medium, a display 108, an I/F (interface) 109, a keyboard 110, and a mouse 111. It is noted that the above components of the print processing apparatus are interconnected via a bus 100.

The CPU 101 is configured to control overall operations of the print processing apparatus. The ROM 102 is configured to store programs such as boot programs. The RAM 103 is used as a working area of the CPU 101. The HDD 104 is configured to control data read/write operations for reading/writing data from/on the HD 105 according to control operations of the CPU 101. The HD 105 is configured to store data written therein through control operations of the HDD 104.

The FDD 106 is configured to control data read/write operations for reading/writing data from/on the FD 107 according to control operations of the CPU 101. The FD 107 is configured to store data written through control operations of the FDD 106, and data stored in the FD 107 may be read by an apparatus. It is noted that the detachable storage medium is not limited to the FD 107, and other forms of storage media such as a CD (CD-R, CD-RW), a MO (magneto-optical disk), a DVD (digital versatile disk), or a memory card may be used. The display 108 is configured to display various forms of data including a cursor, an icon, a tool box, text, images, and function information, for example. Specifically, the display 108 may correspond to a CRT, a TFT liquid crystal display, or a plasma display, for example.

The I/F (interface) 109 is connected to a network via a communications line 112, and is connected to other print processing apparatuses via the network. The I/F 109 corresponds to an interface between the network and the interior of the print processing apparatus, and is configured to control the input/output of data to/from other print processing apparatuses and printers, for example. Specifically, the I/F 109 may correspond to a modem or a LAN adapter, for example.

The keyboard 110 is used to realize data input, and includes keys for inputting characters, numbers, and various commands. It is noted that a touch panel type input pad or a ten key may also be used to realize such data input. The mouse 111 may be used to move a cursor, select a range, or change the position or size of a window, for example. It is noted that other forms of pointing devices with similar functions such as a track ball, a joystick, a cross key, or a jog dial may be used as well.

Also, it is noted that other types of input means such as a scanner may be connected to the bus 100 as is necessary or desired.

First Embodiment

Figure 1:
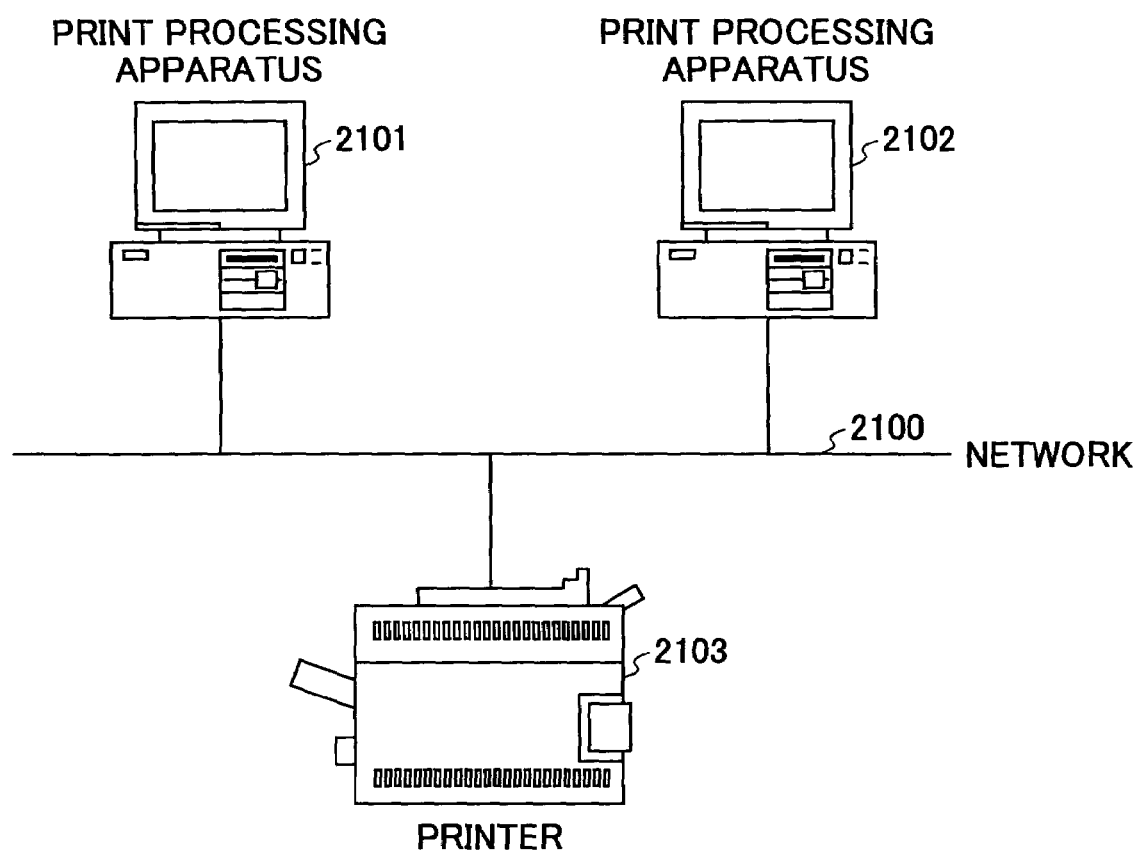
FIG. 1 is a diagram illustrating an exemplary configuration of a print processing system according to the prior art.
Figure 2:
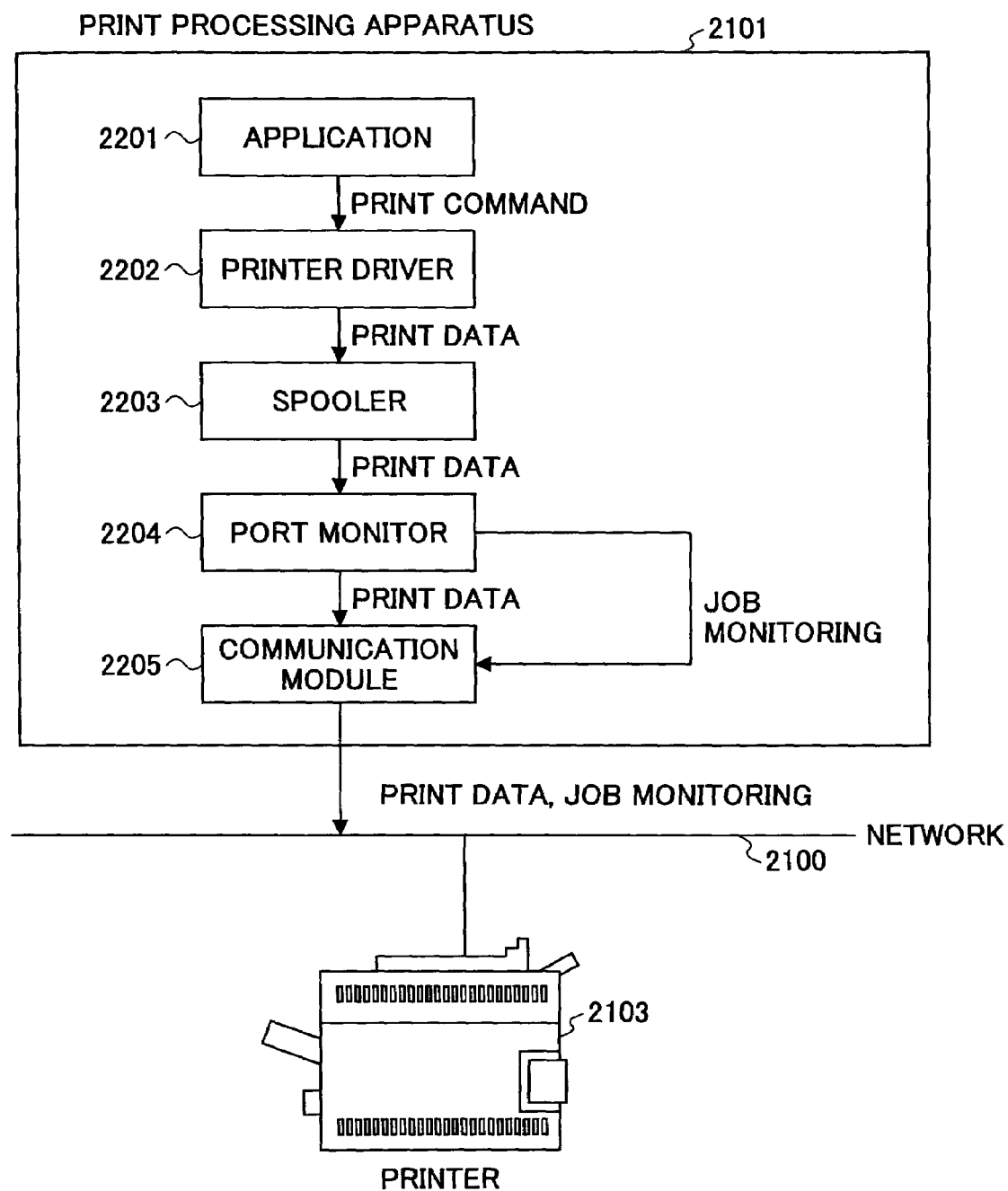
FIG. 2 is a diagram illustrating a functional configuration of a print processing apparatus according to the prior art.

In the following, a first embodiment of the present invention is described. It is noted that the overall functional configuration of a print processing apparatus according to the first embodiment is identical to that of the print processing apparatus 2101 shown in FIG. 2. The difference between the print processing apparatus according to the present embodiment and that of the prior art lies in the configurations of the printer driver and the port monitor. Specifically, in the print processing apparatus according to the prior art, the port monitor is configured to monitor a print job within a printer and conduct error/completion notification. In the print processing apparatus according to the present embodiment, such monitoring and error/completion notification is realized by operations of the printer driver and the port monitor. In the following, the printer driver and the port monitor of the print processing apparatus according to the present embodiment are described in detail.

Figure 5:
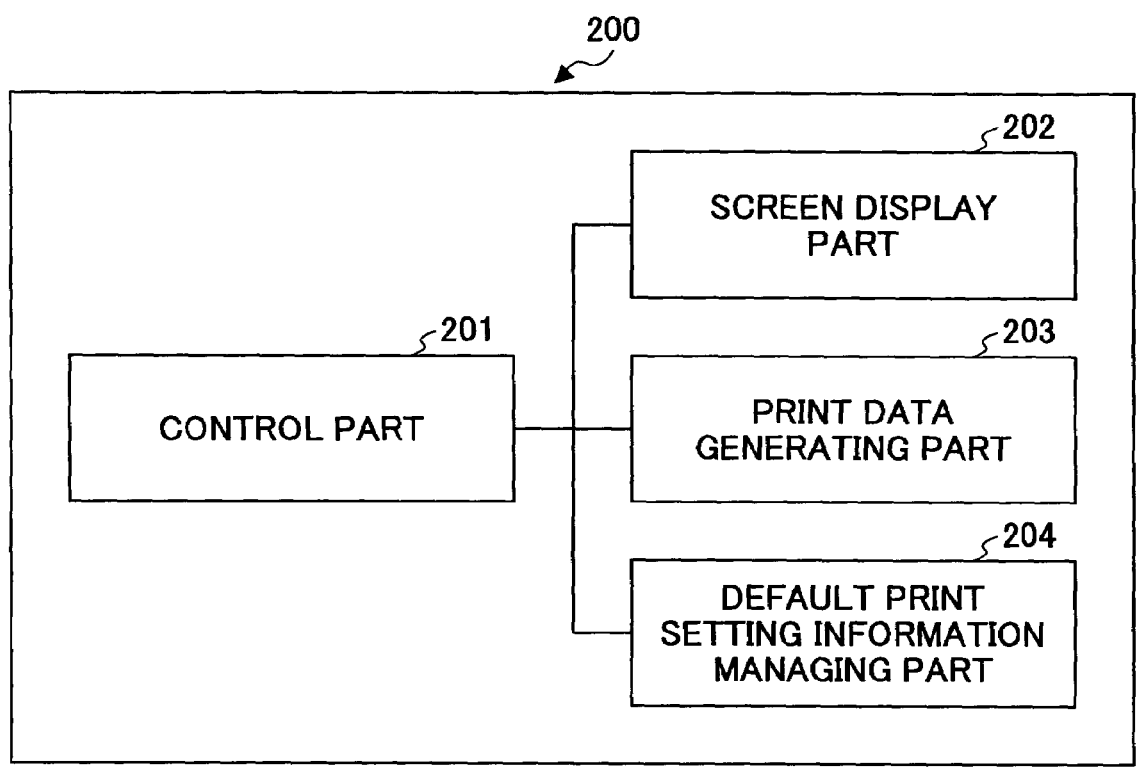
FIG. 5 is a block diagram showing a functional configuration of a printer driver of a print processing apparatus according to a first embodiment of the present invention.

FIG. 5 is a block diagram showing a functional configuration of a printer driver 200 of the print processing apparatus according to the present embodiment. As is shown in this drawing, the printer driver 200 includes a control part 201, a screen display part 202, a print data generating part 203, and a default print setting information managing part 204.

The control part 201 controls overall operations of the printer driver 200. The screen display part 202 displays a print setting screen (described in detail below), and acquires print setting values that are set by a user at the print setting screen. The print data generating part 203 generates print data based on a print command from an application and the print setting values acquired from the screen display part 202. The default print setting information managing part 204 stores and manages default values of the setting values used by the screen display part 202 upon displaying the print setting screen.

It is noted that the functions of the control part 201 and the print data generating part 203 may be realized by the CPU 101 shown in FIG. 4, for example. The functions of the screen display part 202 may be realized by the CPU 101 and the display 108 shown in FIG. 4, for example. The functions of the default print setting information managing part 204 may be realized by the CPU 101, the HD 105, and the HDD 104 shown in FIG. 4, for example.

In the following, operations of the printer driver 200 of the print processing apparatus according to the present embodiment are described.

Figure 6:
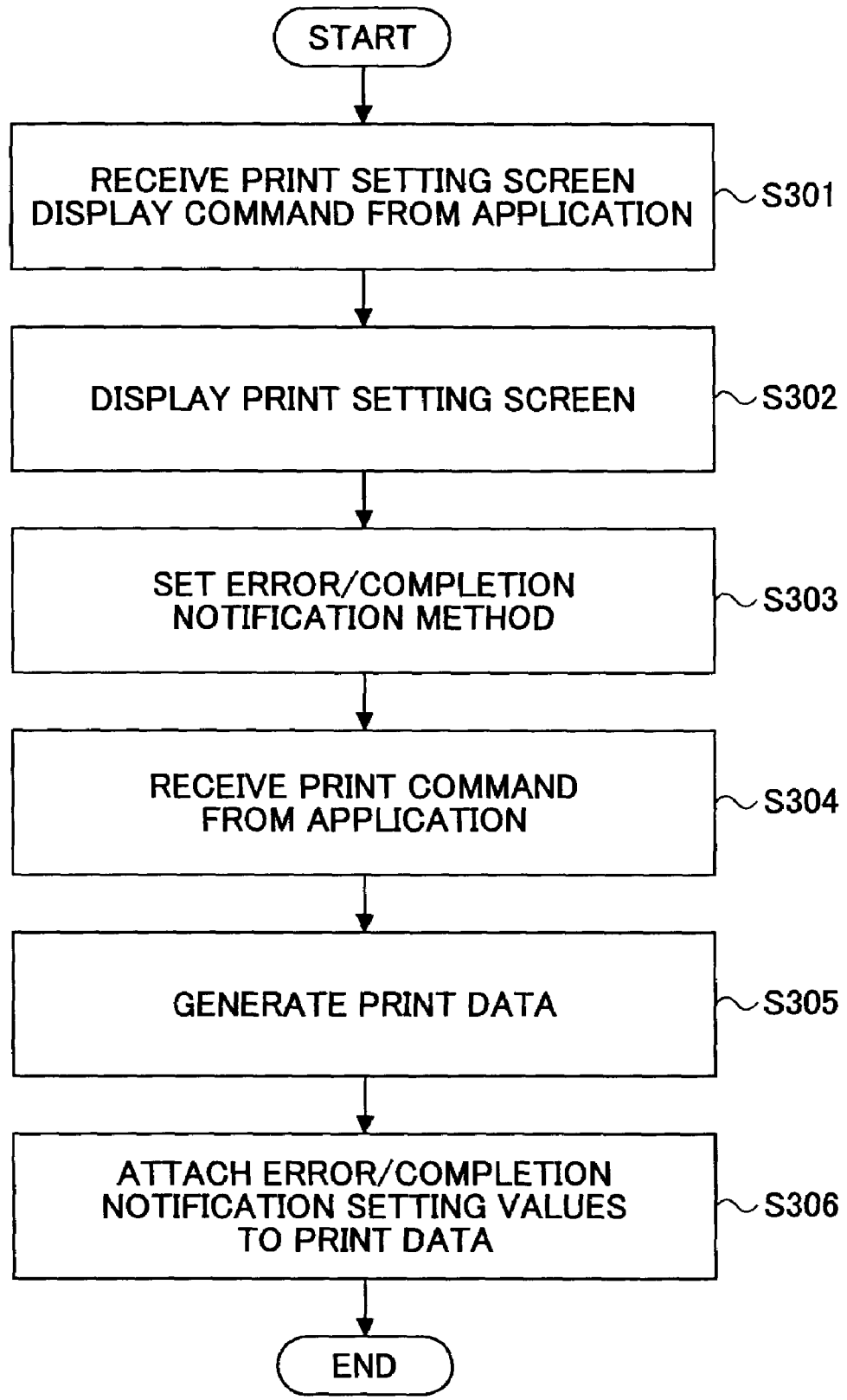
FIG. 6 is a flowchart illustrating process steps performed by the printer driver of the print processing apparatus according to the first embodiment.

FIG. 6 is a flowchart illustrating process steps performed by the printer driver 200 of the print processing apparatus according to the present embodiment.

Figure 7:
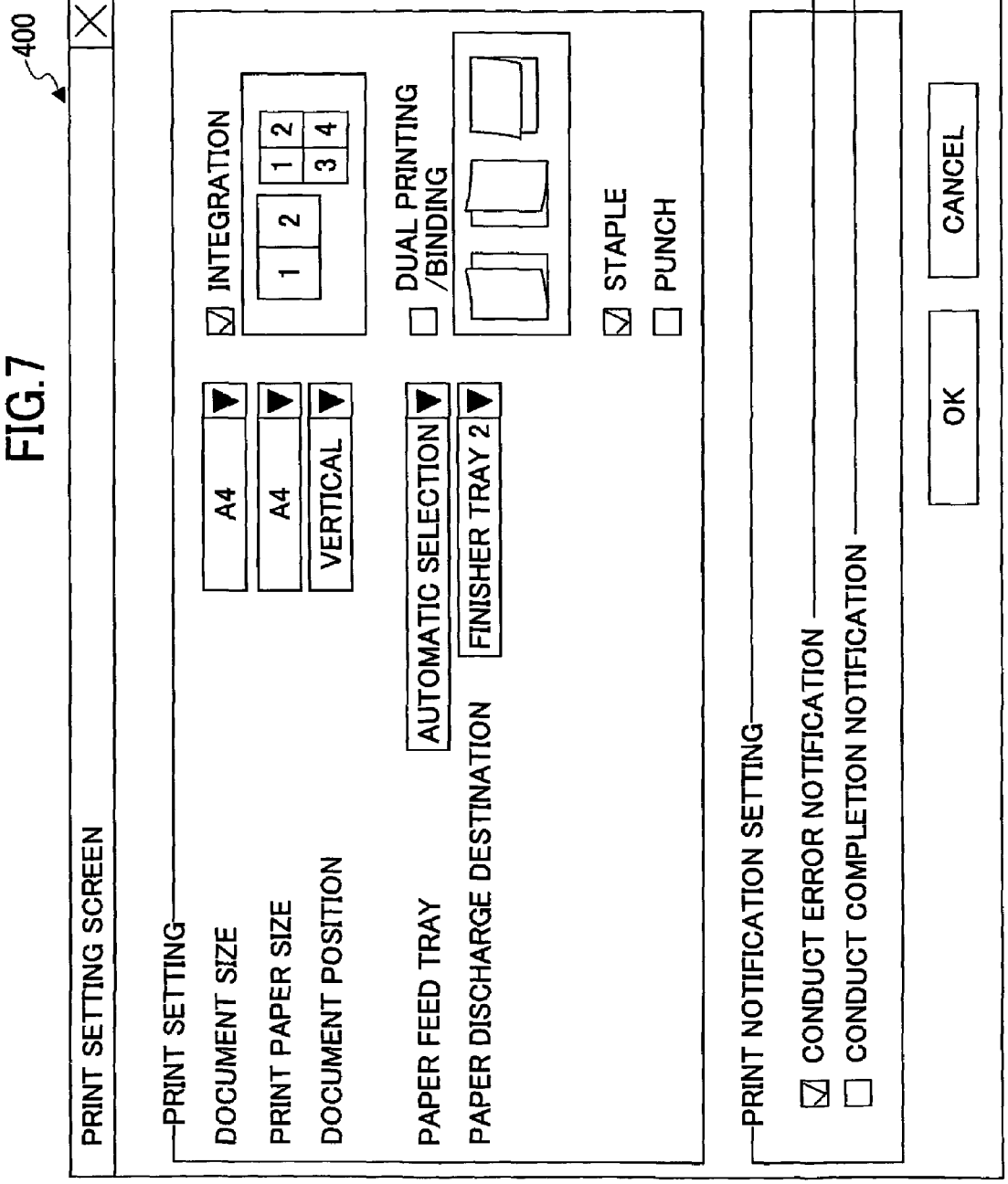
FIG. 7 is a diagram illustrating an example of a print setting screen displayed at the print processing apparatus according to the first embodiment.

As is shown in this drawing, when a print setting screen display command is received from an application (step S301), a print setting screen is displayed by the screen display part 202 (step S302). FIG. 7 is a diagram illustrating an example of the print setting screen that may be displayed in step S302. The print setting screen 400 illustrated in this drawing indicates default values for the print setting conditions (e.g., document size, print paper size, document position, error notification setting, and job completion notification setting) stored in the default print setting information managing part 204. Then, the user may set the error/completion notification method (step S303). For example, the error/completion notification method may be set by selecting whether to conduct error/completion notification for every print job or to conduct the error/completion notification only for a particular print job. Then, upon receiving a print execution command from the application (step S304), the print data generating part 203 generates print data based on the print command and the print setting values other than the error/completion notification setting values that are set at the print setting screen 400 (step S305). Then, the print data generating part 203 attaches the error/completion notification setting values to the print data generated in step S305 (step S306).

Figure 8:
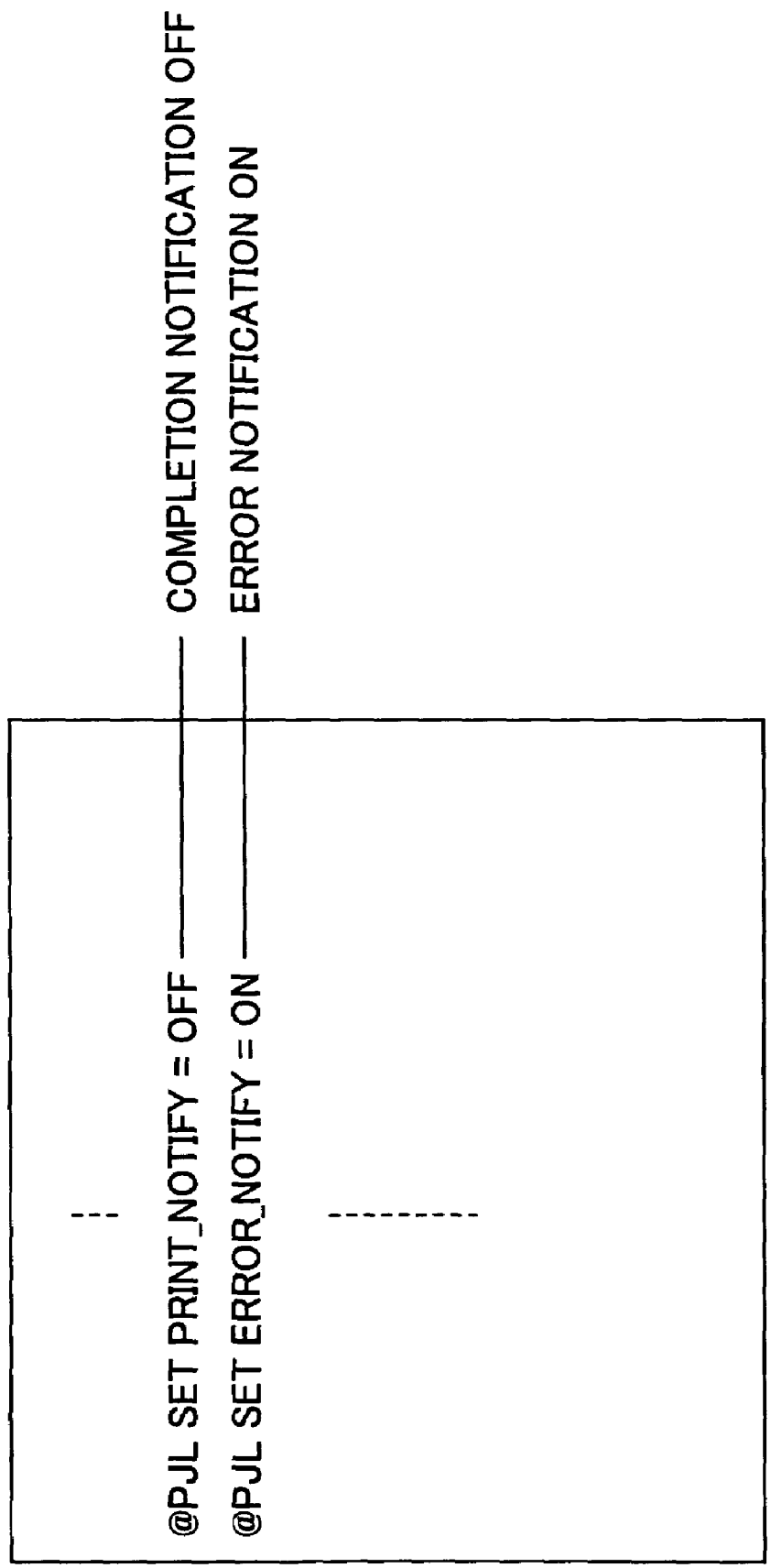
FIG. 8 is a diagram illustrating an exemplary configuration of final print data generated at the print processing apparatus according to the first embodiment.

FIG. 8 is a diagram illustrating an exemplary configuration of print data generated by performing the process steps S301 through S306. According to the illustrated data example, the completion notification setting for transmitting a notification when processing for a predetermined print job is completed is set off, and the error notification setting for transmitting a notification when an error occurs during processing of a print job is set on. It is noted that in this drawing, data contents other than those indicating the error/completion notification setting values are omitted.

Figure 9:
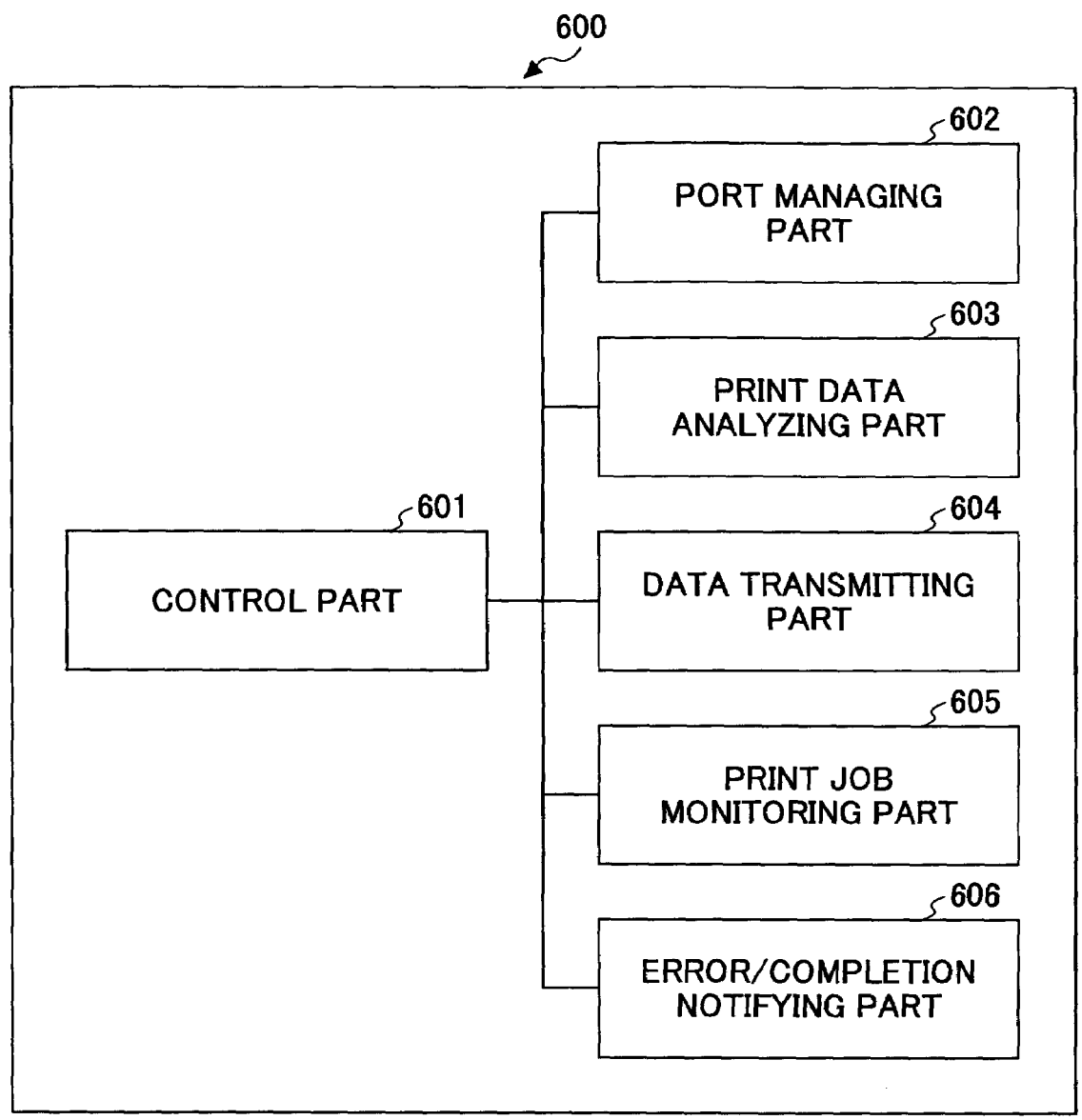
FIG. 9 is a block diagram showing a functional configuration of a port monitor of the print processing apparatus according to the first embodiment.

FIG. 9 is a block diagram showing a functional configuration of a port monitor 600 of the print processing apparatus according to the present embodiment. As is shown in this drawing, the port monitor 600 includes a control part 601, a port managing part 602, a print data analyzing part 603, a data transmitting part 604, a print job monitoring part 605, and an error/completion notifying part 606.

The control part 601 is configured to control overall operations of the port monitor 600. The port managing part 602 is configured to manage port information such as printer address information. The print data analyzing part 603 is configured to analyze print data transmitted from a spooler, and acquire print setting values. The data transmitting part 604 is configured to transmit the print data to a printer via a network. The print job monitoring part 605 is configured to monitor the status of a print job within a printer via a network. The error/completion notifying part 606 is configured to display a predetermined notification screen to notify a user of the occurrence of an error during processing of a print job or the completion of the print job according to print job monitoring performed by the print job monitoring part 605.

It is noted that the functions of the control part 601 and the print data analyzing part 603 may be realized by the CPU 101 shown in FIG. 4, for example. The functions of the port managing part 602, the data transmitting part 604, and the print job monitoring part 605 may be realized by the CPU 101 and the I/F 109 shown in FIG. 4, for example. The functions of the error/completion notifying part 606 may be realized by the CPU 101 and the display 108 shown in FIG. 4, for example.

In the following, operations of the port monitor 600 of the print processing apparatus according to the present embodiment are described.

Figure 10:
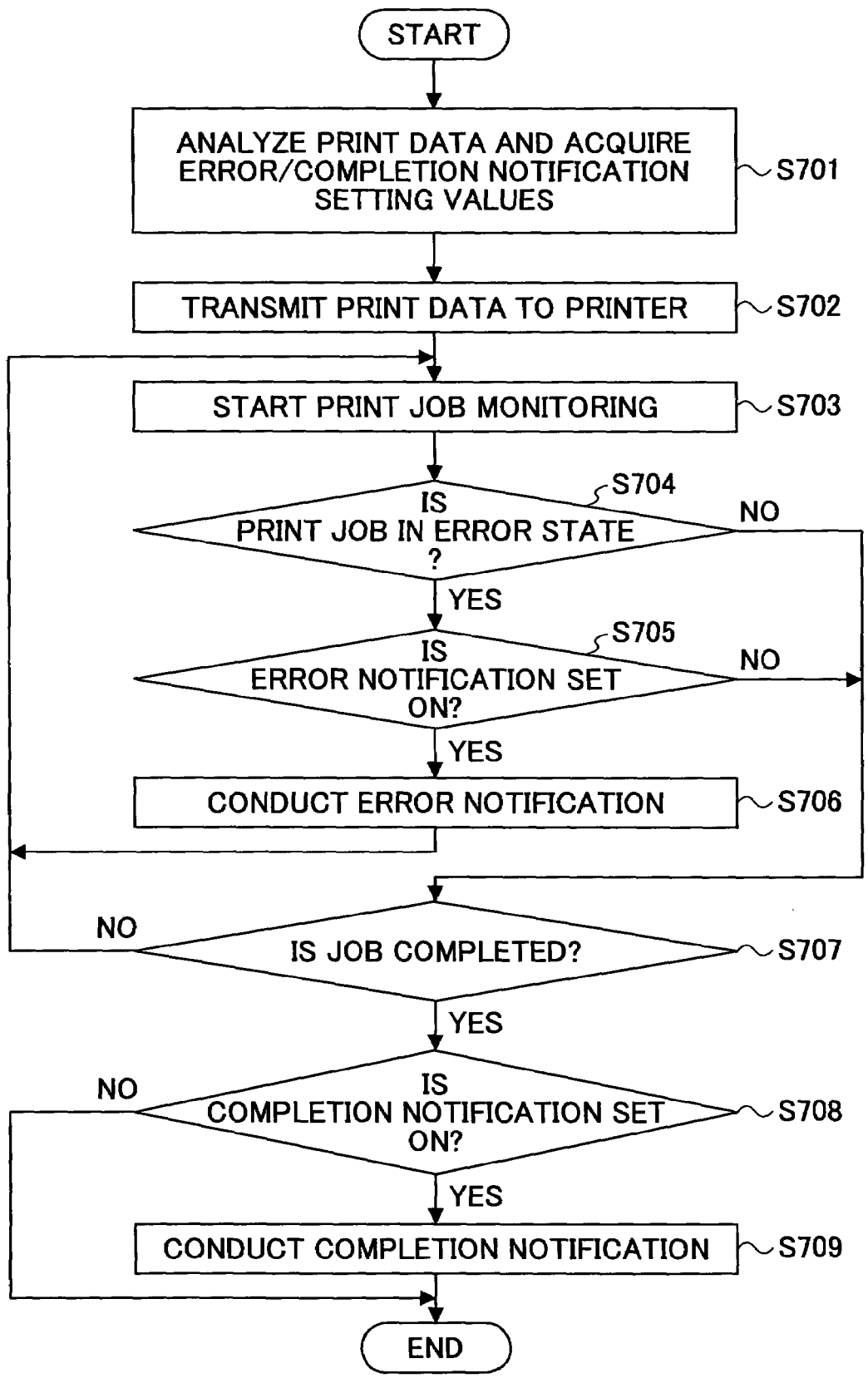
FIG. 10 is a flowchart illustrating process steps performed by the port monitor of the print processing apparatus according to the first embodiment.

FIG. 10 is a flowchart illustrating process steps performed by the port monitor 600 according to the present embodiment.

As is shown in this drawing, first, the print data analyzing part 603 analyzes print data transmitted from a spooler, and acquires the error/completion notification setting values attached to the print data (step S701). Then, the data transmitting part 604 transmits the print data to a printer via a network (step S702). Then, the print job monitoring part 605 determines whether the status of the print job being monitored is in an error state (step S704). If the status of the print job is in an error state (step S704, Yes), the operation proceeds to step S705. If the status of the print job is not in an error state (step S704, No), the operation proceeds to step S707.

When it is determined in step S705 that the error notification setting is set on (step S705, Yes), the error/completion notifying part 606 displays an error notification screen to notify the user of the occurrence of an error (step S706). Then, the operation goes back to step S703.

When it is determined in step S705 that the error notification setting is set off (step S705, No), the print job monitoring part 605 determines whether the processing of the print job being monitored is completed (step S707). If the status of the print job is completed (step S707, Yes), the operation proceeds to step S708. If the print job is not completed (step S707, No), the operation goes back to step S703, and the process steps S703 through S707 are repeated.

When it is determined in step S707 that the processing of the print job being monitored is completed (step S707, Yes), the print job monitoring part 605 determines whether the completion notification setting is set on in the print data obtained in step S701 (step S708). If the completion notification setting is set on (step S708, Yes), the operation proceeds to step S709. If the completion notification setting is set off (step S708, No), the operation is ended. When it is determined in step S708 that the completion notification setting is set on (step S708, Yes), the error/completion notification part 606 displays a completion notification screen to notify the user of the completion of the print job (step S709).

As can be appreciated from the above descriptions, in the print processing apparatus according to the first embodiment, the printer driver 200 and the port monitor 600 are configured to perform the process steps S301 through S306 and process steps S701 through S709, respectively. In this way, a user may choose whether to conduct error notification/completion notification for every print job, or to conduct error/completion notification only for a particular print job so that usability of the print processing apparatus may be improved.

Second Embodiment

In the following, a second embodiment of the present invention is described. It is noted that the overall functional configuration of a print processing apparatus according to the present embodiment is identical to that of the print processing apparatus according to the first embodiment, and thereby its descriptions are omitted. In the following, operations of the printer driver 200 of the print processing apparatus according to the second embodiment are described.

Figure 11:
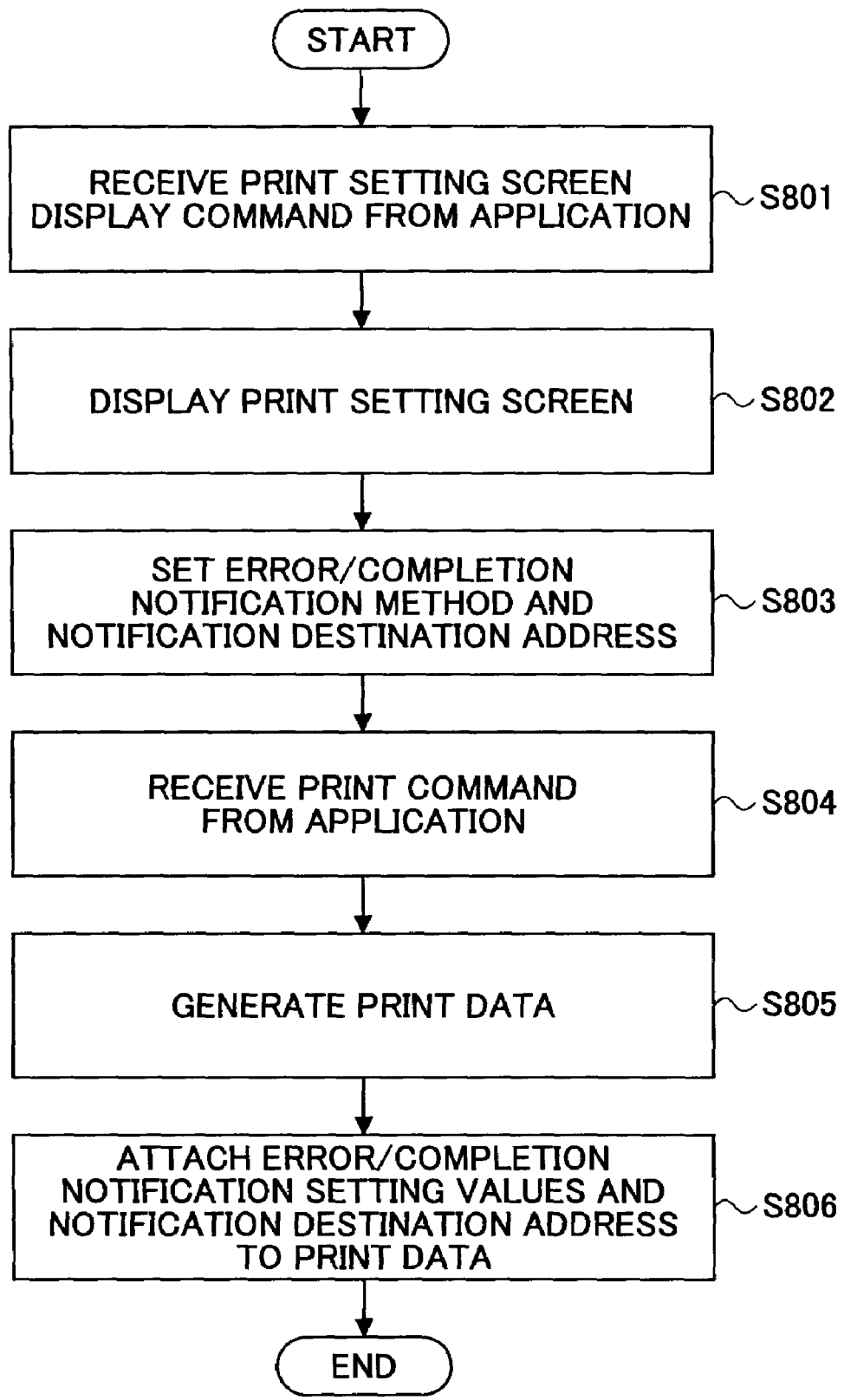
FIG. 11 is a flowchart illustrating process steps that are performed by a printer driver of a print processing apparatus according to a second embodiment of the present invention.

FIG. 11 is a flowchart illustrating process steps that are performed by the printer driver 200 of the print processing apparatus according to the present embodiment.

Figure 12:
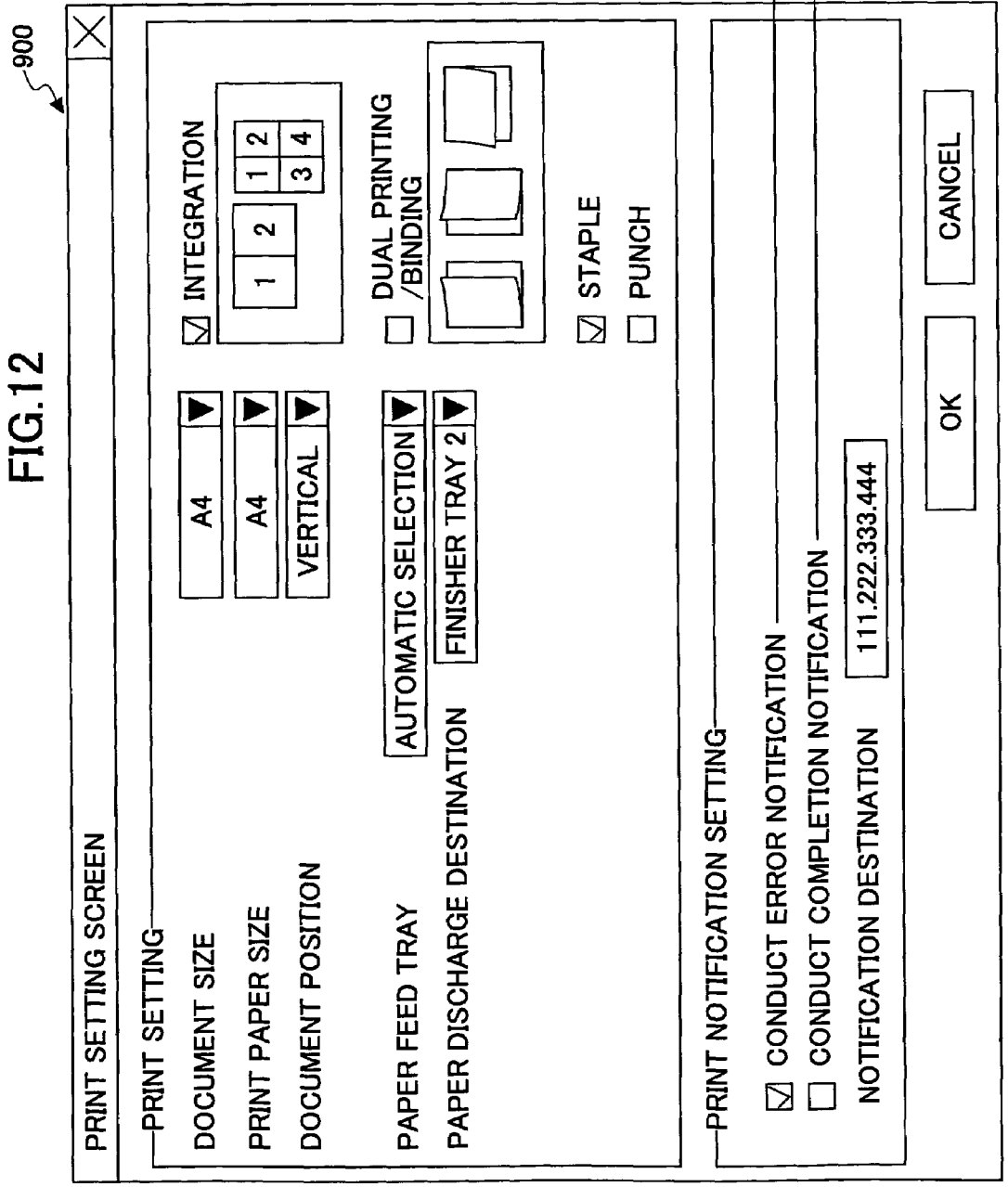
FIG. 12 is a diagram showing an example of a print setting screen displayed at the print processing apparatus according to the second embodiment.

As is shown in this drawing, upon receiving a print setting screen display command from an application (step S801), the screen display part 202 displays the print setting screen (step S802). FIG. 12 is a diagram showing an exemplary print setting screen that may be displayed in step S802. The print setting screen 900 illustrated in this drawing indicates default values of print setting conditions such as document size, print paper size, document position, error notification setting, completion notification setting, and notification destination address that are stored in the default print setting information managing part 204. Then, the user may set the error notification method, the completion notification method, and the notification destination address, for example, via the print setting screen 900 being displayed (step S803). In this case, the error/completion notification method may be set by selecting whether to request error/completion notification for every print job, or to request error/completion notification for only a particular type of print job. Then, upon receiving a print execution command from the application (step S804), the print data generating part 203 generates print data according to the print setting values other than those representing the error/completion notification setting and the notification destination address (step S805). Then, the print data generating part 203 attaches the error/completion notification setting values and notification destination address to the print data generated in step S805 (step S806).

Figure 13:
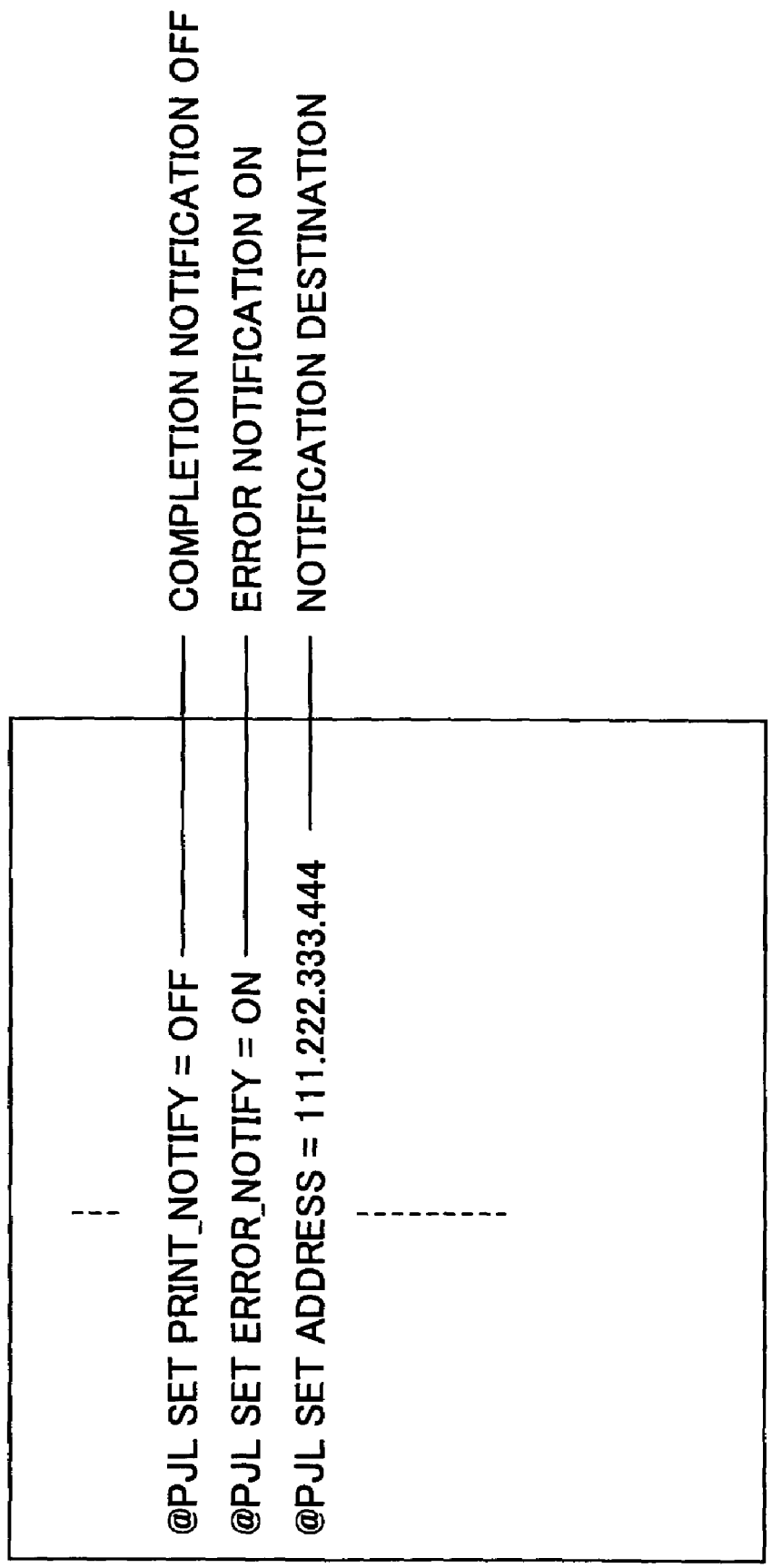
FIG. 13 is a diagram illustrating an exemplary data configuration of final print data generated at the print processing apparatus according to the second embodiment.

FIG. 13 is a diagram illustrating an exemplary data configuration of the print data generated by performing the process steps S801 through S806. According to the illustrated data example, the completion notification setting for transmitting a completion notification when a predetermined print job is completed is set off, the error notification setting for transmitting an error notification when an error occurs while processing a predetermined print job is set on, and a notification destination address is set. It is noted that data contents other than the error/completion notification setting values and the notification destination address are omitted from the illustrated print data example.

In the following operations of the port monitor 600 according to the present embodiment are described.

Figure 14:
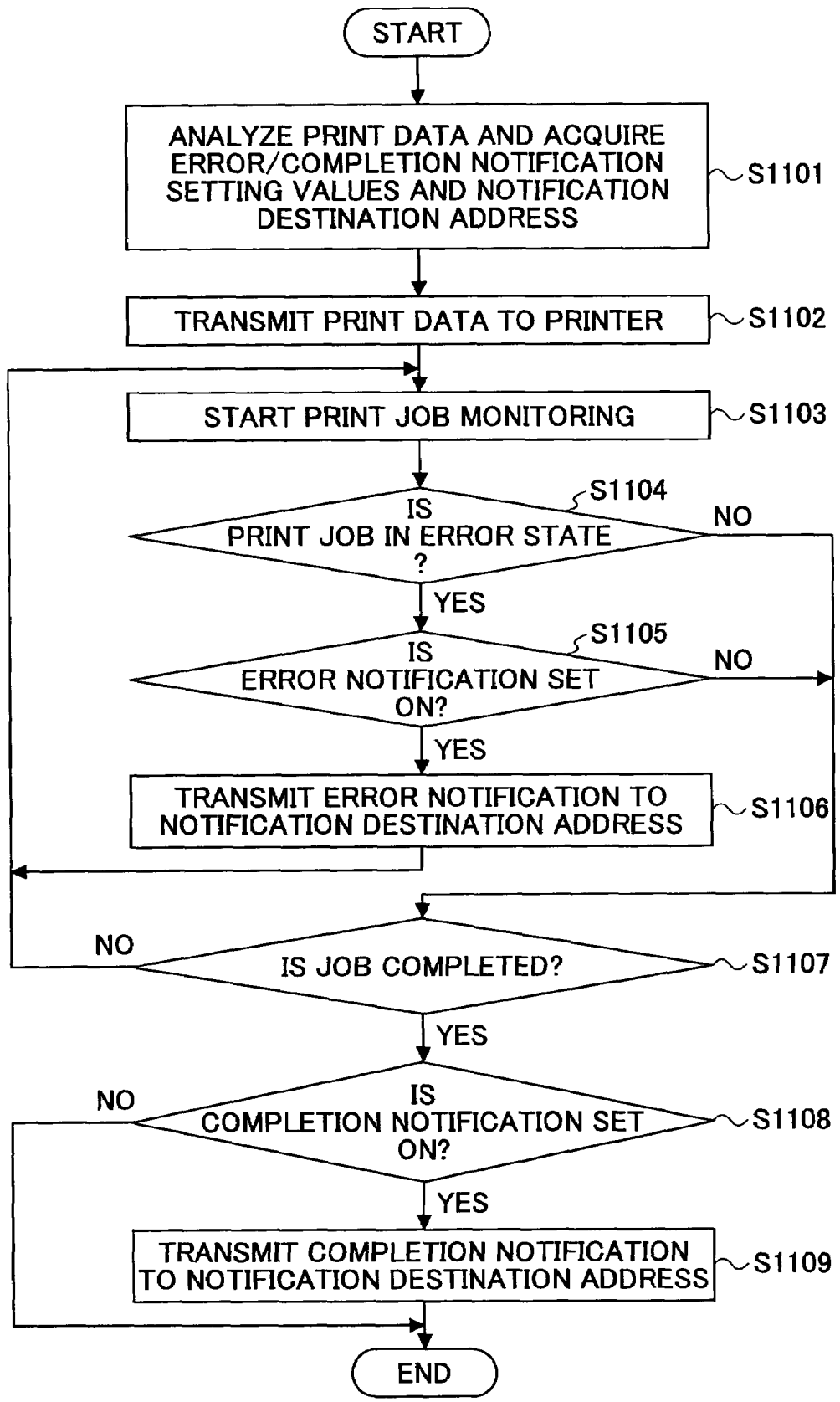
FIG. 14 is a flowchart illustrating process steps performed by a port monitor of the print processing apparatus according to the second embodiment.

FIG. 14 is a flowchart illustrating process steps performed by the port monitor 600 of the print processing apparatus according to the present embodiment.

As is shown in this drawing, first, the print data analyzing part 603 analyzes data transmitted from a spooler, and acquires error/completion notification setting values and a notification destination address (step S1101). Then, the data transmitting part 604 transmits the print data to a printer via a network (step S1102). Then, the print job monitoring part 605 starts monitoring the print job transmitted to the printer via the network (step S1103). The print job monitoring part 605 determines whether the print job being monitored is in an error state (step S1104). If the print job is in an error state (step S1104, Yes), the operation proceeds to step S1105; and if the print job is not in an error state (step S1104, No), the operation proceeds to step S1107.

When it is determined in step S1104 that the print job is in an error state (step S1104, Yes), the print job monitoring part 605 determines whether the error notification setting acquired in step S1101 is set on (step S1105). If the error notification setting is set on (step S1105, Yes), the operation proceeds to step S1106; and if the error notification setting is set off (step S1105, No), the operation proceeds to step S1107.

When it is determined in step S1105 that the error notification setting is set on (step S1105, Yes), the error/completion notifying part 606 transmits an error notification to a corresponding print processing apparatus with the notification destination address acquired in step S1101 (step S1106). Then, the operation goes back to step S1103.

When it is determined in step S1105 that the error notification setting is set off (step S1105, No), the print job monitoring part 605 determines whether the print job being monitored is completed (step S1107). If the print job is completed (step S1107, Yes), the operation proceeds to step S1108; and if the print job is not completed (step S1107, No), the operation goes back to step S1103, and the process steps S1103 through S1107 are repeated.

When it is determined in step S1107 that the print job being monitored is completed (step S1107, Yes), the print job monitoring part 605 determines whether the completion notification setting acquired in step S1101 is set on (step S1108). If the completion notification setting is set on (step S1108, Yes), the operation proceeds to step S1109; and if the completion notification setting is set off (step S1108, No), the operation is ended. When it is determined in step S1108 that the completion notification setting is set on (step S1108, Yes), the error/completion notifying part 606 transmits a print job completion notification to a corresponding print processing apparatus with the notification destination address acquired in step S1101.

According to the second embodiment of the present invention, error/completion notification is transmitted to a corresponding apparatus with the designated notification destination address for the error/completion notification that is acquired in step S1101. It is noted that in a case where a notification destination address is not set and a notification destination address is not acquired in step S1101, the error/completion notification may be displayed at the apparatus processing the print job.

As can be appreciated from the above descriptions, in the print processing apparatus according to the second embodiment, the printer driver 200 and the port monitor 600 are configured to perform the process steps S801 through S806 and the process steps S1101 through S1108, respectively, so that the print processing apparatus may enable a user to designate an error/completion notification destination address in addition to realizing the features of the print processing apparatus according to the first embodiment. In this way, usability of the print processing apparatus may be further improved. It is particularly noted that in the case of executing a print job for processing a large amount of data or text that requires a long processing time, another print processing apparatus that is not currently processing a print job may be designated to receive the error/completion notification so that the work load of the print processing apparatus processing the print job may be reduced and the print job processing efficiency may be improved.

Third Embodiment

Figure 3:
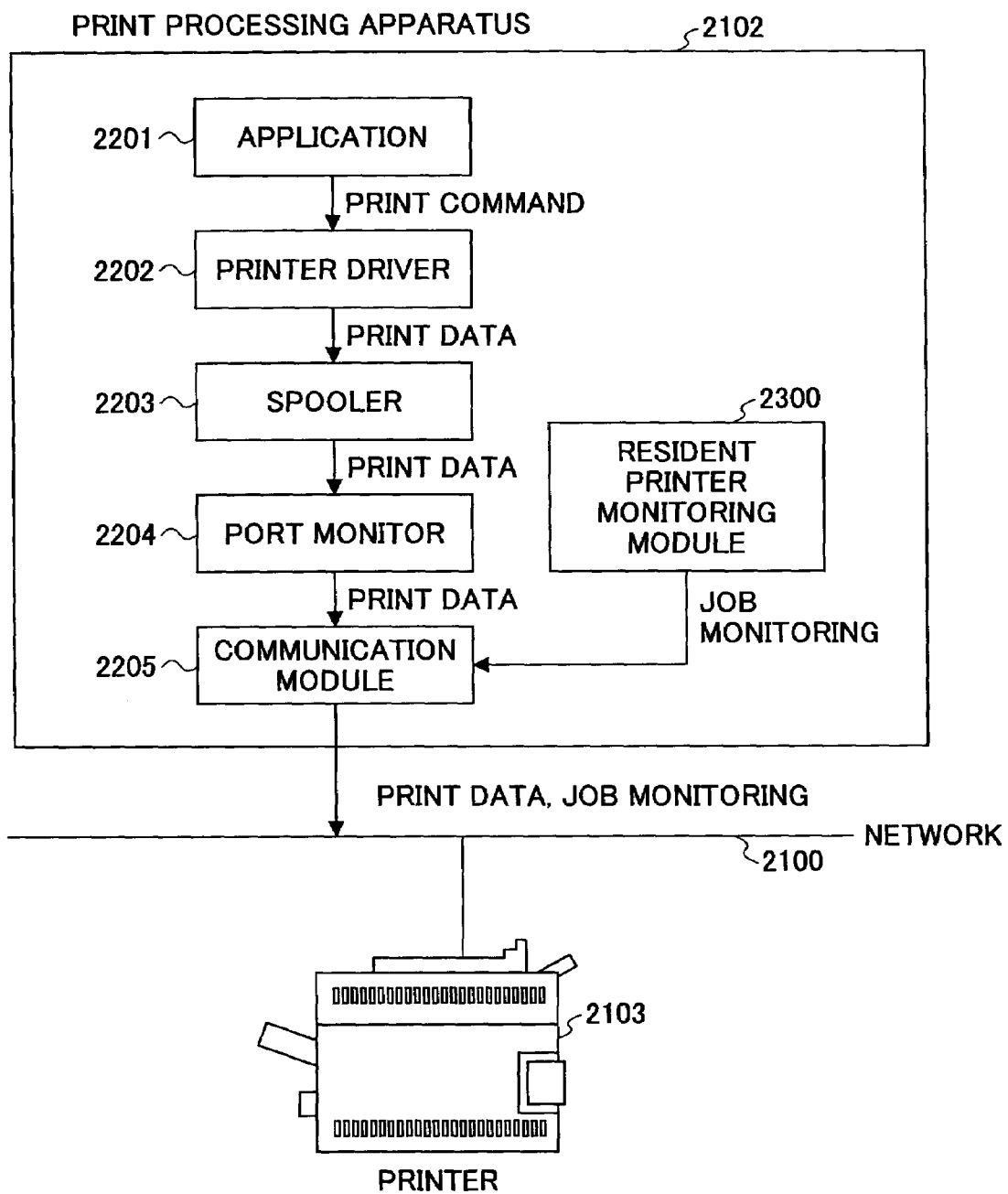
FIG. 3 is a diagram illustrating a functional configuration of another print processing apparatus according to the prior art.

In the following, a third embodiment of the present invention is described. It is noted that the overall functional configuration of a print processing apparatus according to the third embodiment of the present invention is identical to that of the print processing apparatus 2102 shown in FIG. 3, and thereby its descriptions are omitted. The difference between the print processing apparatus according to the present embodiment and that of the prior art lies in the configurations of the printer driver and the resident printer monitoring module. In the print processing apparatus according to the prior art, the resident printer monitoring module is activated on a constant basis to monitor the print job within a printer and conduct error/completion notification. On the other hand, in the print processing apparatus according to the present embodiment, the monitoring and error/completion notification is realized by operations of the printer driver and the resident printer monitoring module. In the following, a printer driver, a port monitor, and a resident printer monitoring module of the print processing apparatus according to the present invention are described.

Figure 15:
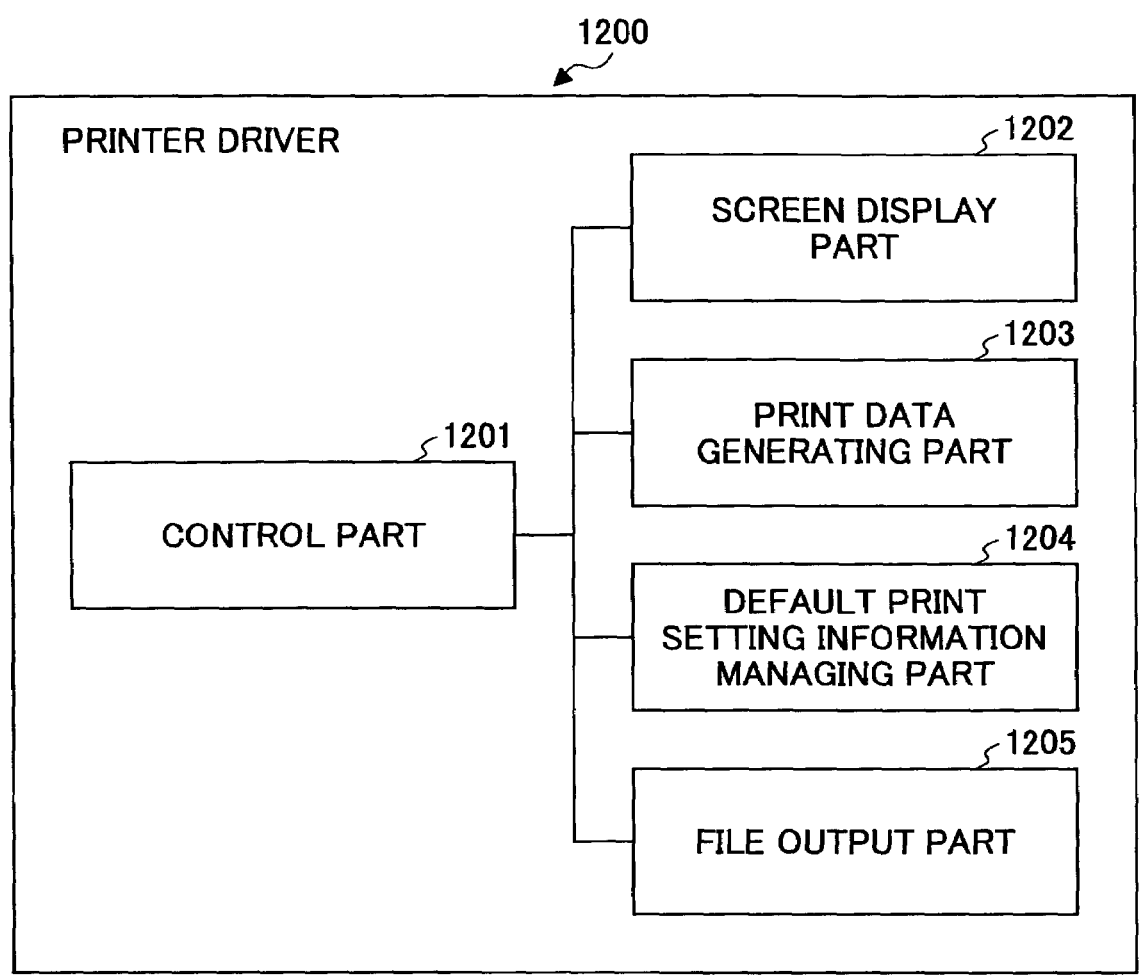
FIG. 15 is a block diagram illustrating a functional configuration of a printer driver of the print processing apparatus according to a third embodiment of the present invention.

FIG. 15 is a block diagram illustrating a functional configuration of the printer driver 1200 of the print processing apparatus according to the present embodiment. The illustrated printer driver 1200 includes a control part 1201, a screen display part 1202, a print data generating part 1203, a default print setting information managing part 1204, and a file output part 1205.

The control part 1201 is configured to control overall operations of the printer driver 1200. The screen display part 1202 is configured to display a print setting screen, which is described in detail below. The print data generating part 1203 is configured to generate print data according to a print command from an application and print setting values set at the screen display part 1202. The default print setting information managing part 1204 is configured to store and manage default values of setting values that are used by the screen display part 1202 upon displaying the print setting screen. The file output part 1205 is configured to write the print setting values in a predetermined file (i.e., output the print setting values to a predetermined file).

It is noted that the functions of the control part 1201, the print data generating part 1203, and the file output part 1205 may be realized by the CPU 101 shown in FIG. 4, for example. The functions of the screen display part 1202 may be realized by the CPU 101 and the display 108 shown in FIG. 4, for example. The functions of the default print setting information managing part 1204 may be realized by the CPU 101, the HD 105, and the HDD 104 shown in FIG. 4, for example.

In the following, operations of the printer driver 1200 of the print processing apparatus according to the present embodiment are described.

Figure 16:
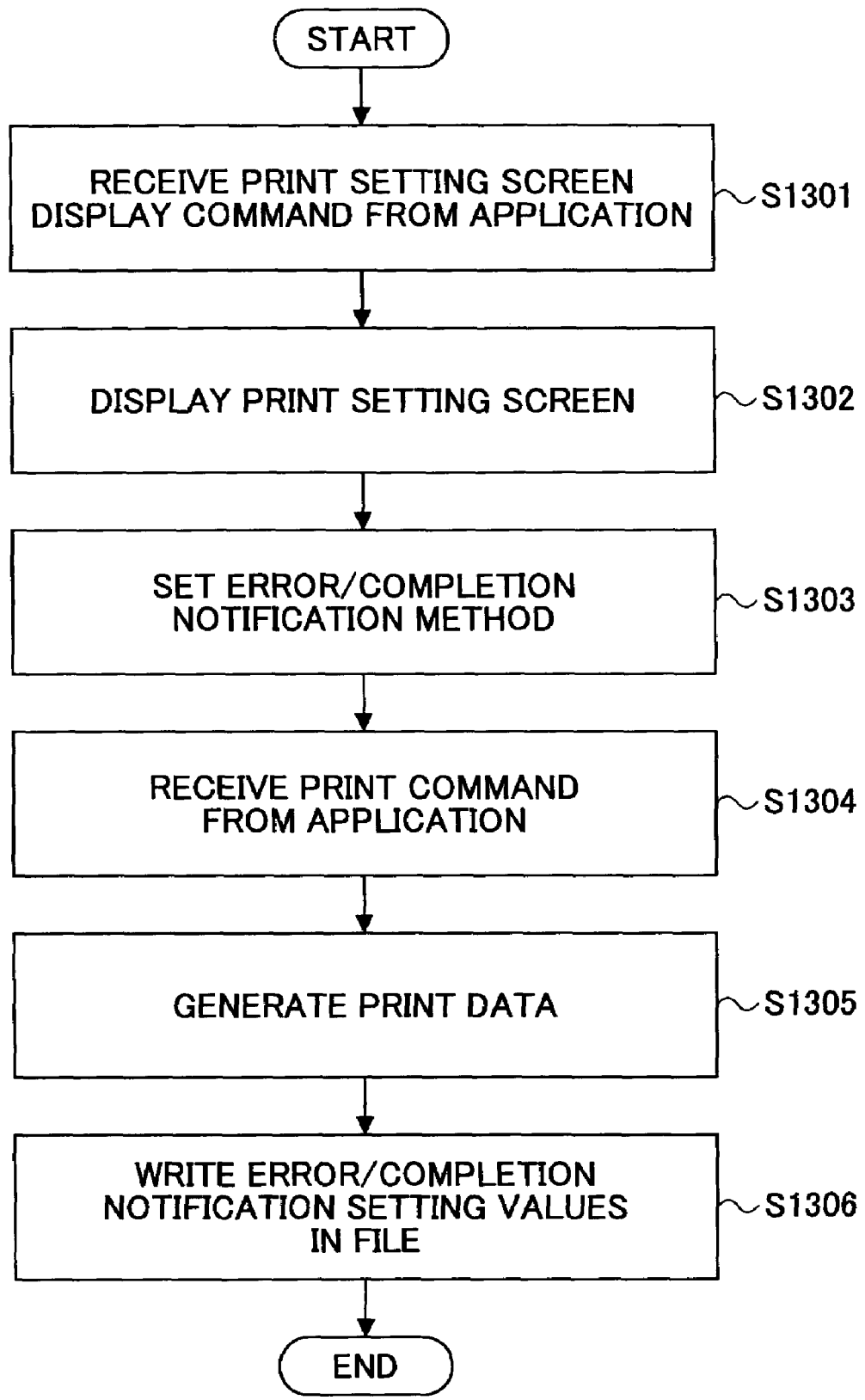
FIG. 16 is a flowchart illustrating process steps performed by the printer driver of the print processing apparatus according to the third embodiment.

FIG. 16 is a flowchart illustrating process steps performed by the printer driver 1200 of the print processing apparatus according to the present embodiment.

As is shown in this drawing, upon receiving a print setting screen display command from an application (step S1301), the screen display part 1202 displays a print setting screen (step S1302). It is noted that the print setting screen 400 illustrated in FIG. 7 may be displayed in step S1302, for example. The print setting screen 400 indicates initial values for print setting conditions such as document size, print paper size, document position, error notification setting, and completion notification setting, for example. Then, the user may set the error notification method and the completion notification method via the displayed print setting screen 400 (step S1303). In this case, the error/completion notification method may be set by selecting whether to conduct error/completion notification for every print job, or to conduct error/completion notification only for a particular print job, for example.

Figure 17:
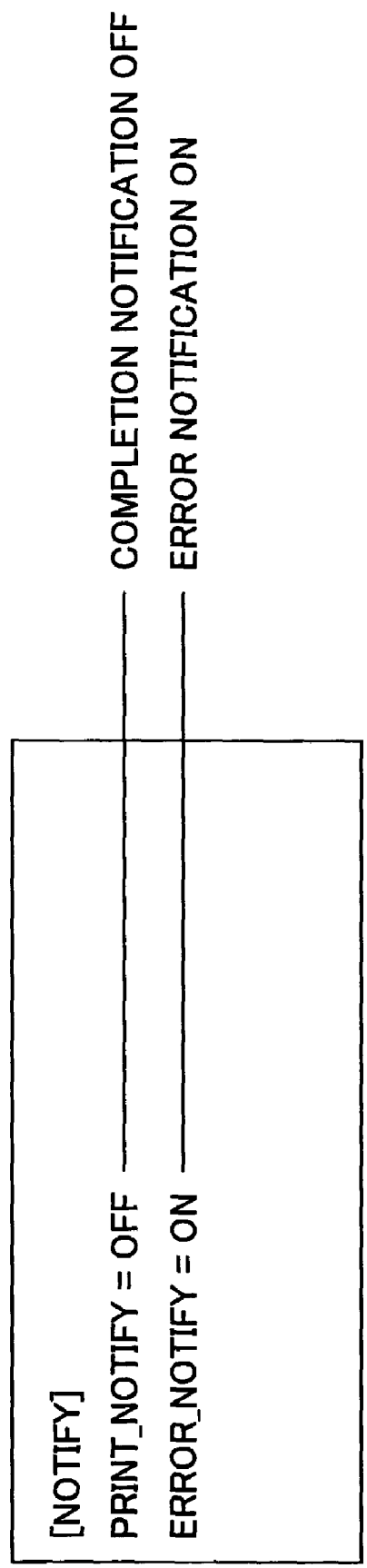
FIG. 17 is a diagram illustrating an exemplary format of error/completion notification setting values output to a file by the print processing apparatus according to the third embodiment.

Upon receiving a print command from an application (step S1304), the print data generating part 1203 generates print data according to the print command and the print setting values other than the error/completion notification setting values that are set at the print setting screen 400 (step S1305). Then, the file output part 1205 writes the error/completion notification setting values set in step S1303 in a predetermined file (step S1306). FIG. 17 is a diagram illustrating an exemplary format of error/completion notification setting values output to a file in step S1306. According to the illustrated example, the completion notification setting for transmitting a completion notification when processing of a predetermined print job is completed is set off, and the error notification setting for transmitting an error notification when an error occurs during processing of a print job is set on.

In the following, operations of a port monitor 1500 of the print processing apparatus according to the present embodiment are described.

Figure 18:
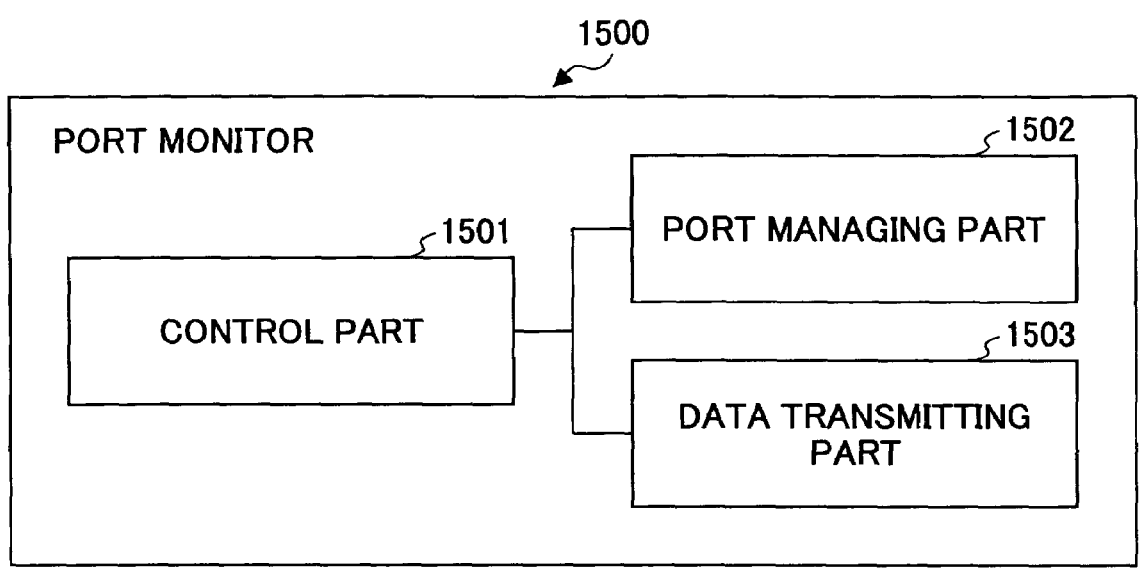
FIG. 18 is a block diagram illustrating a functional configuration of a port monitor of the print processing apparatus according to the third embodiment.

FIG. 18 is a block diagram illustrating a functional configuration of the port monitor 1500 according to the present embodiment. As is shown in this drawing, the port monitor 1500 includes a control part 1501, a port managing part 1502, and a data transmitting part 1503.

The control part 1501 is configured to control overall operations of the port monitor 1500. The port managing part 1502 is configured to manage port information such as printer address information. The data transmitting part 1503 is configured to transmit print data to a printer via a network.

It is noted that the functional configuration of the port monitor 1500 may be identical to that of a port monitor used in a conventional print processing apparatus. The functions of the control part 1501 and the port managing part 1502 may be realized by the CPU 101 shown in FIG. 4, for example. The functions of the data transmitting part 1503 may be realized by the CPU 101 and the I/F 109 shown in FIG. 4, for example.

In the following, the resident printer monitoring module 1600 of the print processing apparatus according to the third embodiment is described.

Figure 19:
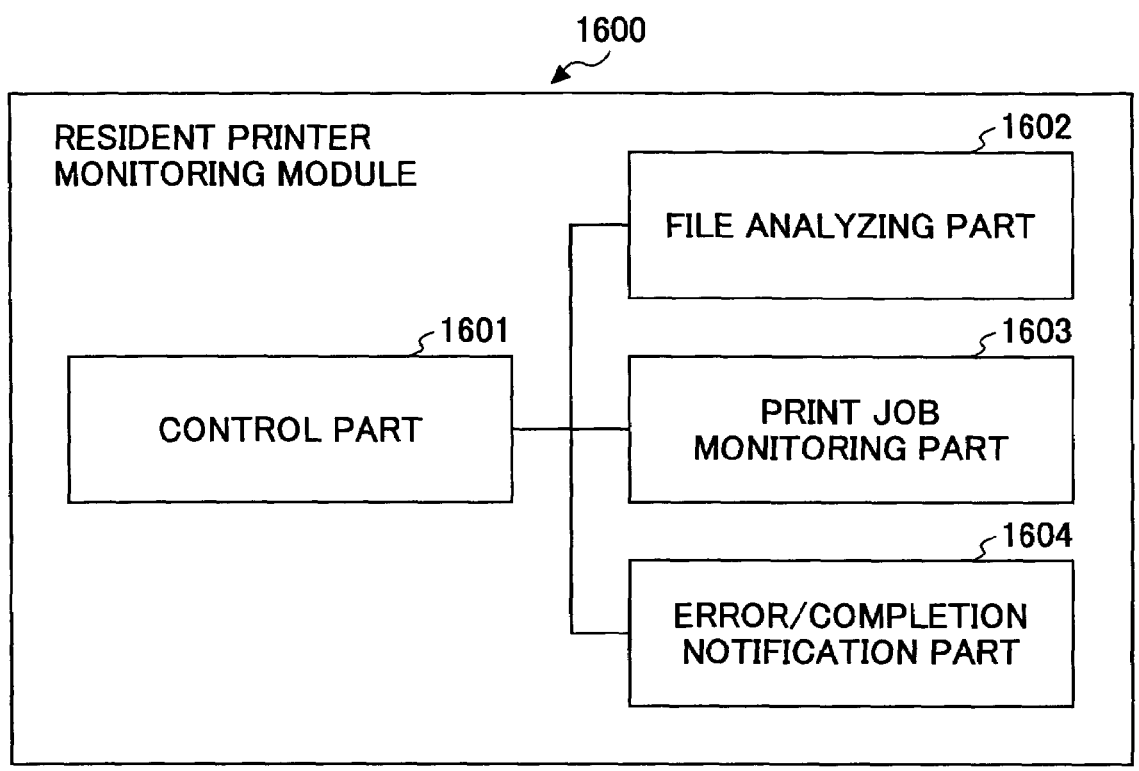
FIG. 19 is a block diagram showing a functional configuration of a resident printer monitoring module of the print processing apparatus according to the third embodiment.

FIG. 19 is a block diagram showing a functional configuration of the resident printer monitoring module 1600 of the print processing apparatus according to the present embodiment. As is shown in this drawing, the resident printer monitoring module 1600 includes a control part 1601, a file analyzing part 1602, a print job monitoring part 1603, and an error/completion notifying part 1604.

The control part 1601 is configured to control overall operations of the resident printer monitoring module 1600. The file analyzing part 1602 is configured to analyze the file output by the printer driver 1200 to acquire the print setting values. The print job monitoring part 1603 is configured to monitor the status of the print job within a printer via a network. The error/completion notification part 1604 is configured to display a corresponding notification screen when the print job being monitored falls into an error state or is completed.

It is noted that functions of the control part 1601 and the file analyzing part 1602 may be realized by the CPU 101 shown in FIG. 4, for example. The functions of the print job monitoring part 1603 may be realized by the CPU 101 and the I/F 109, for example. The functions of the error/completion notifying part 1604 may be realized by the CPU 101 and the display 108, for example.

In the following, operations of the resident printer monitoring module 1600 of the print processing apparatus according to the third embodiment are described.

Figure 20:
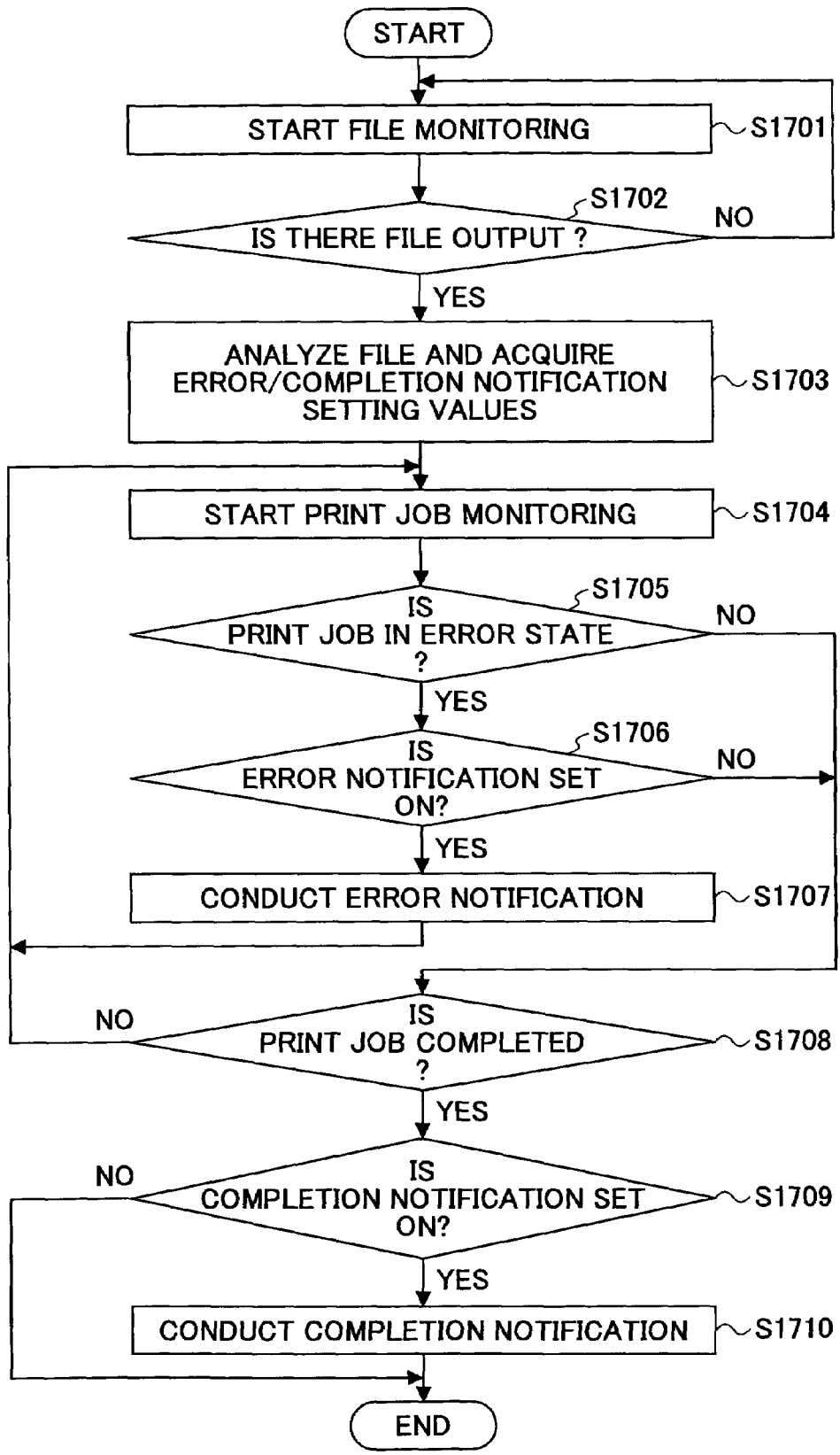
FIG. 20 is a flowchart illustrating process steps performed by the resident printer monitoring module of the print processing apparatus according to the third embodiment.

FIG. 20 is a flowchart illustrating process steps performed by the resident printer monitoring module 1600 of the print processing apparatus according to the present embodiment.

As is shown in this drawing, the file analyzing part 1602 starts a monitoring process for monitoring the output of a file by the printer driver 1200 (step S1701). Then, the file analyzing part 1602 determines whether there is a file (file output) to be processed (step S1702). If a file output is detected (step S1702, Yes), the operation proceeds to step S1703; and if no file output is detected (step S1702, No), the operation goes back to step S1701.

When a file output is detected in step S1702 (step S1702, Yes), the file analyzing part 1602 analyzes the file and acquires the error/completion notification setting values (step S1703) described therein. Then, the print job monitoring part 1603 starts monitoring a print job within a printer or some other apparatus via a network (step S1704). The print job monitoring part 1603 determines whether the print job being monitored is in an error state (step S1705). If the print job is in an error state (step S1705, Yes), the operation proceeds to step S1706; and if the print job is not in an error state (step S1705, No), the operation proceeds to step S1708.

When it is determined in step S1705 that the print job is in an error state (step S1705, Yes), the print job monitoring part 1603 determines whether the error notification setting value acquired in step S1703 is set on (step S1706). If the error notification setting is set on (step S1706, Yes), the operation proceeds to step S1707; and if the error notification setting is set off (step S1706, No), the operation proceeds to step S1708.

When it is determined in step S1706 that the error notification setting is set on (step S1706, Yes), the error/completion notifying part 1604 displays an error notification screen to notify the user of the occurrence of an error (step S1707). Then, the operation goes back to step S1704.

When it is determined that the error notification setting is set off (step S1706, No), the print job monitoring part 1603 determines whether the print job being monitored is completed (step S1708). If the print job is completed (step S1708, Yes), the operation proceeds to step S1709; and if the print job is not completed (step S1708, No), the operation goes back to step S1704, and the process steps S1704 through S1708 are repeated.

When it is determined in step S1708 that the print job is completed (step S1708, Yes), the print job monitoring part 1603 determines whether the completion notification setting value acquired in step S1703 is set on (step S1709). If the completion notification setting is set on (step S1709, Yes), the operation proceeds to step S1710; and if the completion notification setting is set off (step S1709, No), the operation is ended. When it is determined in step S1709 that the completion notification setting is set on (step S1709, Yes), the error/completion notifying part 1604 displays a completion notification screen to notify the user of the completion of the print job (step S1710).

As can be appreciated from the above descriptions, in the print processing apparatus according to the third embodiment of the present invention, the printer driver 1200 and the resident printer monitoring module 1600 are configured to perform the process steps S1301 through S1306 and the process steps S1701 through S1710, respectively, so that the user may be able to select whether to request error/completion notification for every print job or to request error/completion notification for only a particular print job so that usability of the print processing apparatus may be improved.

Fourth Embodiment

In the following, a fourth embodiment of the present invention is described. It is noted that the overall functional configuration of the print processing apparatus according to the present embodiment is identical to that of the print processing apparatus according to the third embodiment, and thereby, its descriptions are omitted.

Figure 21:
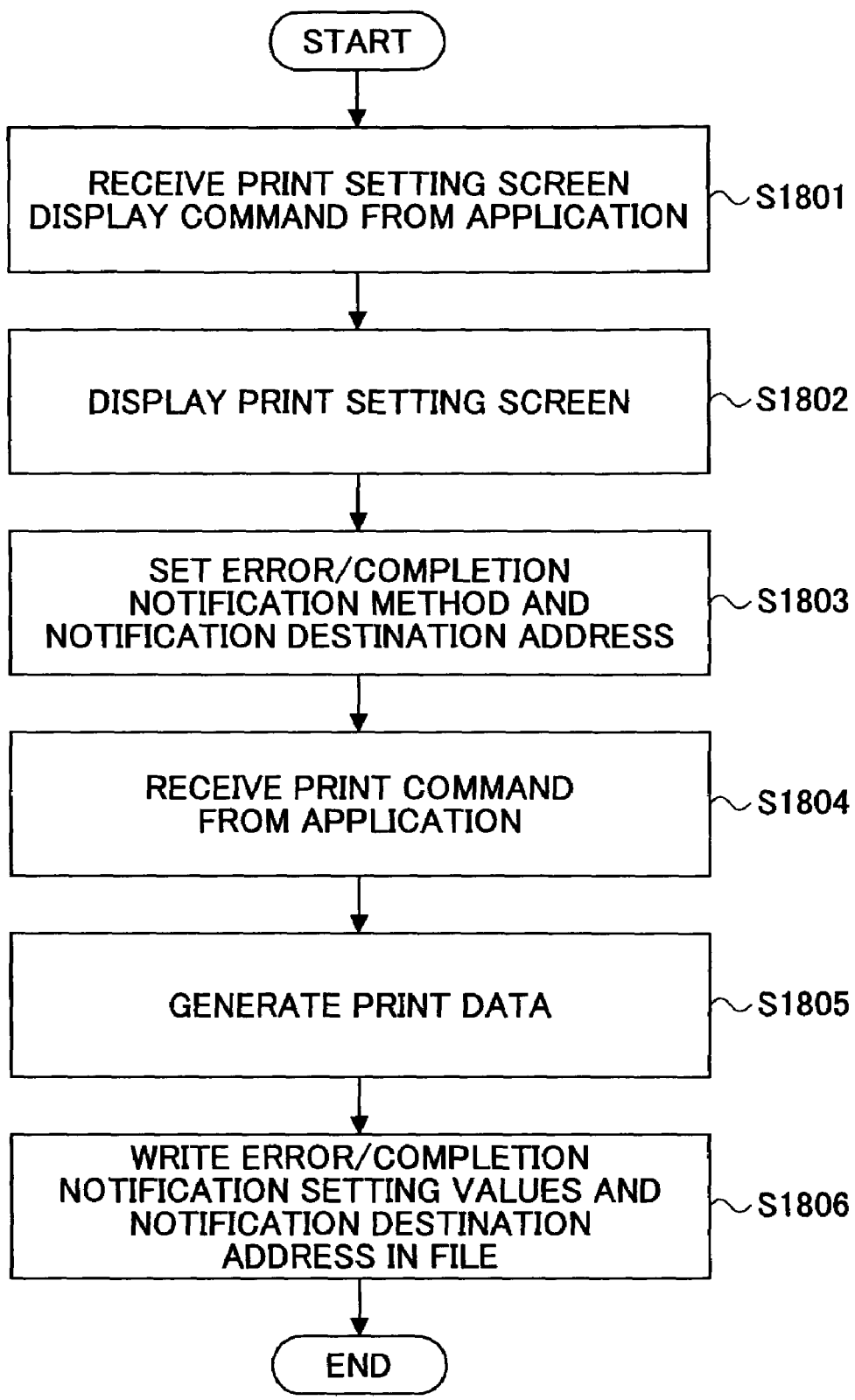
FIG. 21 is a flowchart illustrating process steps performed by the printer driver of the print processing apparatus according to the third embodiment.

FIG. 21 is a flowchart illustrating process steps performed by the printer driver 1200 of the print processing apparatus according to the present embodiment.

As is shown in this drawing, when a print setting command display command is received from an application (step S1801), the screen display part 1202 displays a print setting display screen (step S1802). In this case the display screen 900 shown in FIG. 12 may be displayed, for example. The display screen 900 indicates default values of print setting conditions such as document size, print paper size, document position, error notification setting, completion notification setting, and notification destination address that are stored in the default print setting information managing part 1204. Then, user may set the error notification method, the completion notification method, and the notification destination address, for example, through the displayed print setting screen 900 (step S1803). In this case, the error/completion notification method maybe set by selecting whether to conduct completion notification for every print job or to conduct error/completion notification only for a particular print job.

Figure 22:
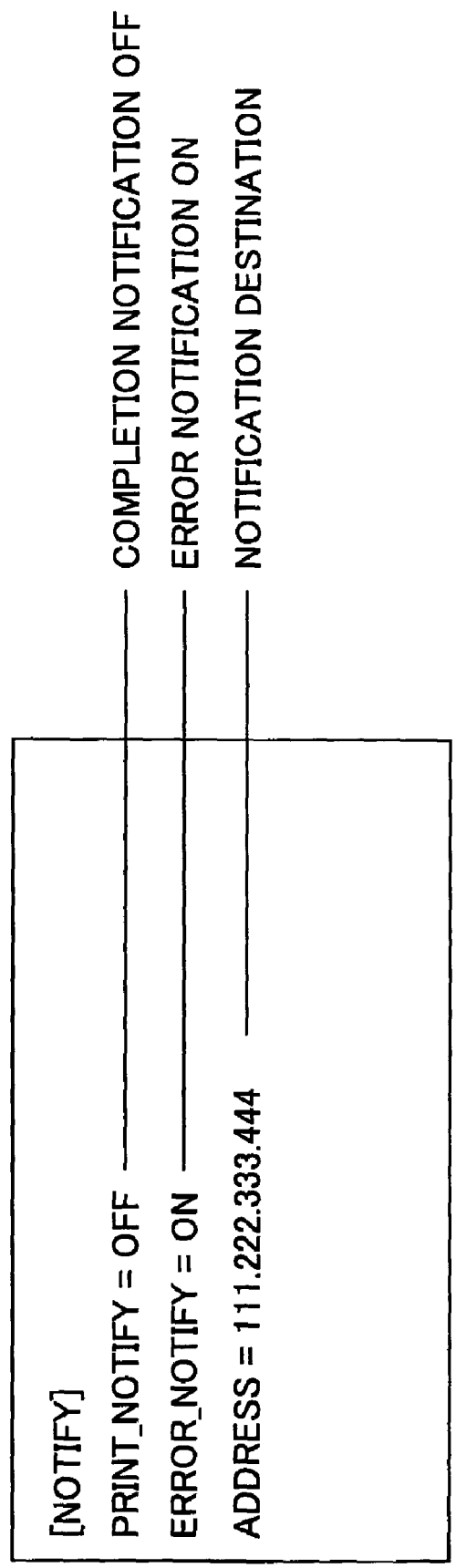
FIG. 22 is a diagram showing an exemplary format of error/completion notification setting values and a notification destination address output to a file by the print processing apparatus according to a fourth embodiment.

Then, upon receiving a print command from the application (step S1804), the print data generating part 1203 generates print data according to the print command and the print setting values other than the error/completion notification setting values and the notification destination address that are set at the print setting screen 900 (step S1805). Then, the file output part 1205 writes the error/completion notification setting values and the notification destination address in a predetermined file (step S1806). FIG. 22 is a diagram showing an exemplary configuration of a file describing error/completion notification setting values and a notification destination address. In the illustrated file, the completion notification setting for transmitting a completion notification when processing of a predetermined print job is completed is set off, the error notification setting for transmitting an error notification when an error occurs during processing of a print job is set on, and a notification destination address is set.

In the following, operations of the resident printer monitoring module 1600 of the print processing apparatus according to the fourth embodiment of the present invention are described.

Figure 23:
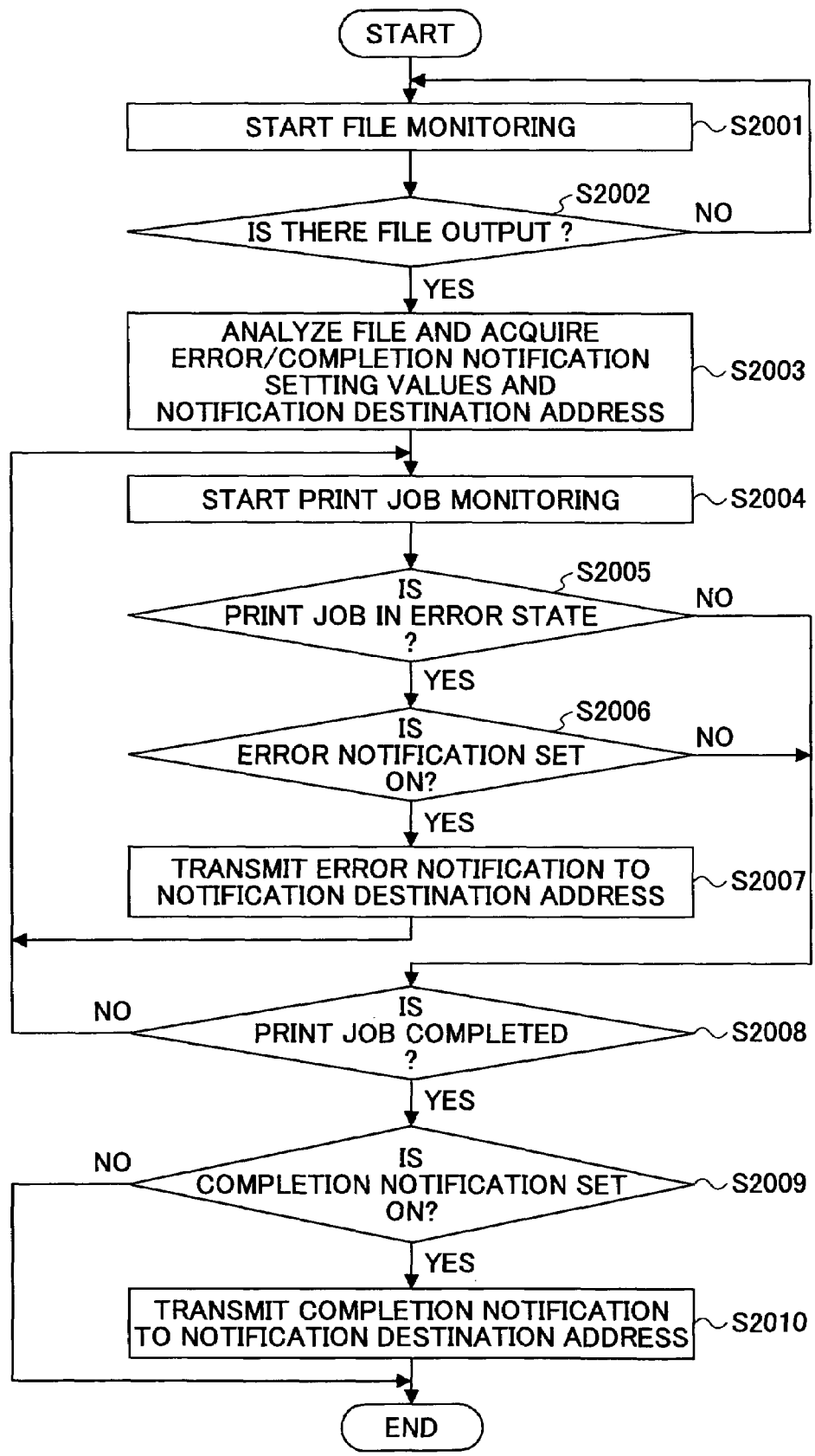
FIG. 23 is a flowchart illustrating process steps performed by the resident printer monitoring module of the print processing apparatus according to the fourth embodiment.

FIG. 23 is a flowchart illustrating process steps performed by the resident printer monitoring module 1600 of the print processing apparatus according to the present embodiment.

As is shown in this drawing, the file analyzing part 1602 starts a monitoring process for monitoring the output of a file by the printer driver 1200 (step S2001). The file analyzing part determines whether there is a file output (step S2002). If a file output is detected (step S2002, Yes), the operation proceeds to step S2003; and if a file output is not detected (step S2002, No), the operation goes back to step S2001.

When a file output is detected in step S2002, the file analyzing part 1602 analyzes the file and acquires the error/completion notification setting values and the notification destination address described therein (step S2003). Then, the print job monitoring part 1603 starts monitoring a print job within a printer or some other apparatus via a network (step S2004). Then, the print job monitoring part 1603 determines whether an error has occurred in the print job being monitored (step S2005). If the print job is in an error state (step S2005, Yes), the operation proceeds to step S2006; and if the print job is not in an error state (step S2005, No), the operation proceeds to step S2008.

When the print job is in an error state (step S2005, Yes), the print job monitoring part 1603 determines whether the error notification setting value acquired in step S2003 is set on (step S2006). If the error notification setting is set on (step S2006, Yes), the operation moves to step S2007; and if the error notification setting is set off (step S2006, No), the operation proceeds to step S2008.

When it is determined in step S2006 that the error notification setting is set on (step S2006, Yes), the error/completion notifying part 1604 transmits an error notification to a corresponding apparatus with the notification destination address (step S2007). Then, the operation goes back to step S2004.

When it is determined in step S2006 that the error notification setting is set off (step S2006, No), the print job monitoring part 1603 determines whether processing of a print job being monitored is completed (step S2008). If the print job is completed (step S2008, Yes), the operation proceeds to step S2009; and if the print job is not completed (step S2008, No), the operation goes back to step S2004.

When it is determined in step S2008 that the print job is completed (step S2008, Yes), the print job monitoring part 1603 determines whether the completion notification setting value acquired in step S2003 is set on (step S2009). If the completion notification setting is set on (step S2009, Yes), the operation proceeds to step S2010; and if the completion notification setting is not set on (step S2009, No), the operation is ended. When it is determined in step S2009 that the completion notification setting is set on (step S2009, Yes), the error/completion notifying part 1604 transmits a completion notification to a corresponding print processing apparatus with the designated notification destination address (step S2010).

According to the fourth embodiment, the error/completion notification is transmitted to the error/completion notification destination address acquired in step S2003; however, it is noted that in a case where the error/completion notification destination address is not set, the error/completion notification may be displayed at the apparatus processing the print job.

As can be appreciated from the above descriptions, in the print processing apparatus according to the fourth embodiment, the printer driver 1200 and the resident printer monitoring module 1600 are configured to perform the process steps S1801 through S1806 and process steps S2001 through S2010, respectively, so that the print processing apparatus may enable the user to designate the error/completion notification destination address in addition to realizing the features of the print processing apparatus according to the third embodiment. In this way the usability of the print processing apparatus may be further improved. Particularly, in the case of processing a print job handling a large amount of data or a large amount of text and requiring a long processing time, another print processing apparatus that is not currently processing a print job may be designated to receive the corresponding error/completion notification so as to reduce the work load of the print processing apparatus currently processing the print job. In this way, print job processing efficiency may be improved.

As can be appreciated from the above descriptions, according to an aspect of the present invention, a user may select whether to conduct error notification for signaling the occurrence of an error during processing of a print job and/or completion notification for signaling the completion of a print job for each print job, or to conduct the error/completion notification only for a particular print job. Accordingly, operations for notifying the user of the progress of a print job may be omitted for a print job for which the user is not particularly concerned so that operational efficiency of the print processing apparatus may be improved. According to another aspect of the present invention, the notification destination may also be set by the user so that the operational efficiency of the print processing apparatus may be further improved.

It is noted that the print processing method according to an embodiment of the present invention may be realized by executing a program run on a computer such as a personal computer or a workstation, for example. The program may be stored in a computer-readable medium such as a hard disk, a flexible disk, a CD-ROM, a MO, or a DVD, and be executed by being read by the computer from the computer-readable medium. Also, the program may take a transmittable form that is distributed via a network such as the Internet.

It is noted that the print processing apparatus, print processing method, and print processing program according to embodiments of the present invention may be advantageous in a case where information on the progress of a print job is desired. In a particular embodiment, the progress may be conveniently checked at another apparatus that is not processing the relevant print job.

Further, it is noted that the present invention is not limited to the embodiments described above, and variations and modifications may be made without departing from the scope of the present invention.

The present application is based on and claims the benefit of the earlier filing date of Japanese Patent Application No.2004-253480 filed on Aug. 31, 2004, the entire contents of which are hereby incorporated by reference.

What is claimed is:

1. A print processing apparatus that performs print data processing based on a print command from an application, the apparatus comprising:
  a print data generating part that generates print data in a format recognizable by a printing apparatus that executes a printing process, the print data being generated based on a print setting value for the print data;
  a notification setting value output part that outputs a notification setting value pertaining to notification of a processing state of the print data to a file having a predetermined format, wherein the file contains no print setting value such that the print data is generated independent of the file;
  a data transmitting part that transmits the print data to the printing apparatus that executes the printing process;
  a file analyzing part that monitors whether the file has been outputted and, when a file output is detected, the file analyzing part extracts the notification setting value from the file; and
  a monitoring part that monitors the processing state of the print data and determines whether to conduct the notification of the processing state of the print data according to the notification setting value extracted by the file analyzing part.

2. The print processing apparatus as claimed in claim 1, wherein
  the notification setting value output part outputs notification destination information designating a destination for the notification to the file.

3. A print processing method comprising:
  a print data generating step for generating print data in a format recognizable by a printing apparatus that executes a printing process, the print data being generated based on a print setting value for the print data;
  a notification setting value outputting step for outputting a notification setting value pertaining to notification of a processing state of the print data to a file having a predetermined format;
  a data transmitting step for transmitting the print data to the printing apparatus that executes the printing process;
  a file data analyzing step for monitoring whether the file has been outputted and, when a file output is detected, extracting the notification setting value from the file; and a monitoring step for determining whether to conduct the notification of the processing state of the print data according to the extracted notification setting value.

4. The print processing method as claimed in claim 3, wherein
the notification setting value outputting step further includes a file outputting step for outputting notification destination information designating a destination of the notification to the file.

5. A computer readable-medium storing a print processing program that when executed causes a computer to perform:
a print data generating step for generating print data in a format recognizable by a printing apparatus that executes a printing process, the print data being generated based on a print setting value for the print data;
a notification setting value outputting step for outputting a notification setting value pertaining to notification of a processing state of the print data and a notification destination information designating a destination that is different from the computer executing the print processing program to receive the notification to a file having a predetermined format;
a data transmitting step for transmitting the print data to the printing apparatus that executes the printing process;
a file data analyzing step for monitoring whether the file has been outputted and, when a file output is detected, extracting the notification setting value and the notification destination information from the file; and
a monitoring step for determining whether to execute the notification of the processing state of the print data according to the extracted notification setting value and the extracted notification destination information.

6. The print processing apparatus as claimed in claim 1, further comprising a screen display part that displays a print setting screen for setting print setting conditions and setting a notification setting method indicating whether to conduct the notification of the processing state of the print data for every print job or for a particular print job.

7. The print processing method as claimed in claim 3, further comprising a print setting screen displaying step for displaying a print setting screen for setting print setting conditions and setting a notification setting method indicating whether to conduct the notification of the processing state of the print data for every print job or for a particular print job.

8. The computer-readable medium as claimed in claim 5, wherein the print processing program further comprises a print setting screen displaying step for displaying a single print setting screen for simultaneously setting print setting conditions and a notification setting method indicating whether to conduct the notification of the processing state of the print data for every print job or for a particular print job.

* * * * *